(12) United States Patent
Kwan

(10) Patent No.: US 10,462,688 B2
(45) Date of Patent: Oct. 29, 2019

(54) ASSOCIATION RULE ANALYSIS AND DATA VISUALIZATION FOR MOBILE NETWORKS

(71) Applicant: CISCO TECHNOLOGY, INC., San Jose, CA (US)

(72) Inventor: Raymond Yuk Chor Kwan, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 14/815,613

(22) Filed: Jul. 31, 2015

(65) Prior Publication Data
US 2016/0381580 A1 Dec. 29, 2016

Related U.S. Application Data

(60) Provisional application No. 62/186,231, filed on Jun. 29, 2015.

(51) Int. Cl.
*H04W 24/08* (2009.01)
*H04L 12/24* (2006.01)
*H04L 12/26* (2006.01)
*G06F 16/28* (2019.01)

(52) U.S. Cl.
CPC .......... *H04W 24/08* (2013.01); *G06F 16/287* (2019.01); *H04L 41/142* (2013.01); *H04L 41/16* (2013.01); *H04L 41/5009* (2013.01); *H04L 43/08* (2013.01)

(58) Field of Classification Search
CPC . G06F 17/30601; H04L 41/142; H04L 41/16; H04L 41/5009; H04L 43/08; H04L 43/0847; H04L 43/0888; H04L 41/22; H04W 24/08
See application file for complete search history.

(56) References Cited

U.S. PATENT DOCUMENTS

2004/0117226 A1* 6/2004 Laiho ............... G06Q 10/06393
705/7.39
2008/0025223 A1* 1/2008 Karacali-Akyamac ......................
H04L 41/12
370/241

(Continued)

OTHER PUBLICATIONS

J. Vesanto, J. Himbery E. Alhoniemi and J. Parhankangas, "SOM Toolbox for Matlab 5", ISBN 951-22-4951-0, Apr. 2000, 60 pages; http://citeseerx.ist.psu.edu/viewdoc/download?doi=10.1.1.25.7561&rep=rep1&type=pdf.

(Continued)

*Primary Examiner* — Robert M Morlan
(74) *Attorney, Agent, or Firm* — Polsinelli PC

(57) ABSTRACT

Embodiments are provided for using association rule mining to analyze performance counters of a mobile network, including converting a plurality of performance counters of a mobile network into a plurality of key performance indicators (KPIs), quantizing each KPI into one value of a set of values associated with that KPI, creating a set of items having multiple subsets corresponding to respective KPIs, where each item of a subset corresponds to a respective value of a particular set of values associated with a particular KPI, and generating association rules based, at least in part, on the set of items. In further embodiments, the quantizing the plurality of KPIs includes quantizing a first KPI into a first value of a set of three or more values associated with the first KPI.

16 Claims, 20 Drawing Sheets

(56) References Cited

U.S. PATENT DOCUMENTS

| | | | | |
|---|---|---|---|---|
| 2013/0143561 | A1* | 6/2013 | Nuss | H04W 24/02 455/436 |
| 2013/0198767 | A1* | 8/2013 | Wang | H04L 65/80 725/14 |
| 2013/0262656 | A1* | 10/2013 | Cao | H04L 41/5009 709/224 |
| 2016/0088502 | A1* | 3/2016 | Sanneck | H04W 24/08 370/242 |
| 2016/0142493 | A1* | 5/2016 | Moriguchi | G06Q 50/10 709/219 |
| 2016/0162346 | A1* | 6/2016 | Kushnir | G06F 11/079 714/37 |

OTHER PUBLICATIONS

J. Laiho, K. Raivio, et al., "Advanced analysis methods for 3G cellular networks", IEEE Trans. on wireless communications, vol. 4, No. 3, May 2005, 13 pages; http://117.55.241.6/library/IEEE/2005/Wireless%20Communications,%20IEEE%20Trans%20on/Volume%204%20issue%20No.3/advanced%20Analysis.pdf.

K. Raivio, O. Simula, et al., "Analysis of mobile radio access network using the self-organizing map". Proc. of *IFIP/IEEE Eighth International Symposium on Integrated Network Management*, Mar. 24-28, 2003, 13 pages; http://citeseerx.ist.psu.edu/viewdoc/download?doi=10.1.1.7.65&rep=rep1&type=pdf.

K. Tasdemir, P. Milenov, "An automated SOM clustering based on data topology", in *Proc. of European Symposium on Artificial Neural Networks—Computational Intelligence and Machine Learning*, Bruges, Belgium, Apr. 28-30, 2010, 6 pages; https://www.elen.ucl.ac.be/Proceedings/esann/esannpdf/es2010-31.pdf.

A. A. Zherebtsov, Y. A. Kuperin, "Application of Self-Organizing Maps for clustering DJIA and NASDAQ100 portfolios", May 14, 2003; arXiv:cond-mat/0305330v1, 28 pages; http://arxiv.org/ftp/cond-mat/papers/0305/0305330.pdf.

M. Hahsler, K. Hornik, "Building on the Arules Infrastructure for Analyzing Transaction Data with R", *Advances in Data Analysis Studies in Classification, Data Analysis, and Knowledge Organization*, Apr. 4, 2007, pp. 449-456, 8 pages; http://michael.hahsler.net/research/arules_gfkl2006/arules_gfkl2006.pdf.

J. Vesanto and E. Alhoniemi, "Clustering of the self-organizing map", *IEEE Transactions on Neural Networks*, vol. 11, No. 3, May 2000, pp. 586-600, 15 pages; http://ftp.it.murdoch.edu.au/units/ICT219/Papers%20for%20transfer/papers%20on%20Clustering/Clustering%20SOM.pdf.

Zaki, et al., "Data Mining And Analysis: Fundamental Concepts and Algorithms," Cambridge University Press, May 2014, 607 pages; http://www.cambridge.org/us/academic/subjects/computer-science/knowledge-management-databases-and-data-mining/data-mining-and-analysis-fundamental-concepts-and-algorithms?format=HB.

Witten, et al., "Data mining—Practical Machine Learning Tools and Techniques," 3rd Ed., Morgan Kaufmann Publishers (ISBN: 978-0-12-374856-0), Jan. 2011, 31 pages.

C. Borgelt, "Efficient Implementations of Apriori and Eclat." In FIMI'03: Proceedings of the IEEE ICDM Workshop on Frequent Itemset Mining Implementations, Nov. 2003, 9 pages; http://www.intsci.ac.cn/shizz/fimi.pdf.

R. Agrawal, R. Srikant, "Fast algorithms for mining association rules", in *Proc. of the International Conference on Very Large Data Bases*, Sep. 12-15, 1994, pp. 487-499, 32 pages; https://www.it.uu.se/edu/course/homepage/infoutv/ht08/vldb94_rj.pdf.

A. Rauber, "LabelSOM: On the Labeling of Self-Organizing Maps", in Proc. of International Joint Conference on Neural Networks (IJCNN'99), vol. 5, Washington, DC, Jul. 10-16, 1999, pp. 3527-3532, 11 pages; http://www.ifs.tuwien.ac.at/ifs/research/pub_html/rau_ijcnn99/ijcnn99.html.

R. Agrawal, T. Imielinski, A. Swami, "Mining association rules between sets of items in large databases", in *Proc. SIGMOD conference*, May 26-28, 1993, pp. 207-216, 10 pages; http://www.it.uu.se/edu/course/homepage/infoutv/ht08/agrawal93mining.pdf.

Han, et al., "Mining Multiple-Level Association Rules in Large Databases," Sch. of Comput. Sci., Simon Fraser Univ., Burnaby, BC; IEEE Transactions on Knowledge and Data Engineering (Impact Factor: 2.07). Oct. 1999; 11(5):798-805. DOI: 10.1109/69.806937; http://www.researchgate.net/publication/3296846_Mining_Multiple-Level_Association_Rules_in_Large_Databases.

R. Srikant, R. Agrawal, "Mining quantitative association rules in large relational databases", in *Proc. ACM SIGMOD*, Montreal, Jun. 4-6, 1996, 12 pages; http://www.cs.sfu.ca/CourseCentral/459/han/papers/srikant96.pdf.

E. Alhoniemi et al., "Process monitoring and modeling using the self-organizing map", Integrated Computer Aided Engineering, vol. 6, No. 1, 1999, pp. 3-14, 8 pages; http://lib.tkk.fi/Diss/2002/isbn951226093X/article1.pdf.

D. Sugatha, Naveen CH, "Quantitative association rule mining on weighted transactional data", *International Journal of Information and Education Technology*, vol. 1, No. 3, Aug. 2011, 6 pages; http://www.ijiet.org/papers/3-A293.pdf.

M. Kylavaja, K. Hatonen, et al., "Trial report on self-organizing map based analysis tool for radio networks", in Proc. of 59th *Vehicular Technology Conference VTC-Spring*, May 17-19, 2004, 5 pages; http://citeseerx.ist.psu.edu/viewdoc/download?doi=10.1.1.64.2042&rep=rep1&type=pdf.

M. Hahsler and S. Chelluboina, "Visualizing association rules in hierarchical groups", presented in the *42nd Symposium on the Interface: Statistical, Machine Learning, and Visualization Algorithms (Interface 2011)*, The Interface Foundation of North America, published Jun. 2011, 11 pages; http://michael.hahsler.net/research/Interface2011/arulesViz/arulesViz.pdf.

M. Hahsler and S. Chelluboina, "Visualizing association rules: Introduction to the R-extension package arulesViz", 27 pages; Jan. 2011 https://cran.r-project.org/web/packages/arulesViz/vignettes/arulesViz.pdf.

G. P. Kumar, A. Sarkar, "Weighted association rule mining and clustering in non-binary search space," Seventh International Conference on Information Technology: New Generations, ITNG 2010, Las Vegas, Nevada, USA, Apr. 12-14, 2010; 7 pages http://www.researchgate.net/publication/220841292.

\* cited by examiner

500

| | |
|---|---|
| [1] "fail.setup.rab.cs" | [37] "fail.setup.rab.ps.NoResource" |
| [2] "fail.setup.rab.ps" | [38] "fail.setup.rab.ps.other" |
| [3] "drop.rab.cs" | [39] "fail.rrc.congestion" |
| [4] "drop.rab.ps" | [40] "fail.rrc.unspecified" |
| [5] "fail.IntraRatRelocExecCs" | [41] "fail.rrc.noreply" |
| [6] "fail.IntraRatRelocExecPs" | [42] "fail.rrc.other" |
| [7] "fail.InterRatRelocExecCs" | [43] "fail.rrc.congestionReg" |
| [8] "fail.InterRatRelocExecPs" | [44] "releaseReq.iu.RLFail.cs" |
| [9] "fail.setup.rb.R99PhCh" | [45] "releaseReq.iu.RabPremp.cs" |
| [10] "fail.setup.rb.R99ProtoErr" | [46] "releaseReq.iu.UserPlaneFail.cs" |
| [11] "fail.setup.rb.R99CellUpdate" | [47] "releaseReq.iu.DirectedRety.cs" |
| [12] "fail.setup.rb.R99ConfigFail" | [48] "releaseReq.iu.OamIntervention.cs" |
| [13] "fail.setup.rb.R99NoReply" | [49] "releaseReq.iu.others.cs" |
| [14] "fail.setup.rb.R99Other" | [50] "releaseReq.iu.RLFail.ps" |
| [15] "fail.setup.rb.HsdpaPhCh" | [51] "releaseReq.iu.RabPremp.ps" |
| [16] "fail.setup.rb.HsdpaProtoErr" | [52] "releaseReq.iu.UserInactivity.ps" |
| [17] "fail.setup.rb.HsdpaCellUpdate" | [53] "releaseReq.iu.UserPlaneFail.ps" |
| [18] "fail.setup.rb.HsdpaConfigFail" | [54] "releaseReq.iu.DirectedRety.ps" |
| [19] "fail.setup.rb.HsdpaNoReply" | [55] "releaseReq.iu.OamIntervention.ps" |
| [20] "fail.setup.rb.HsdpaOther" | [56] "releaseReq.iu.others.ps" |
| [21] "fail.setup.rb.HsupaPhCh" | [57] "rab.rel.utran.gen.ps" |
| [22] "fail.setup.rb.HsupaProtoErr" | [58] "rab.rel.cn.gen.ps" |
| [23] "fail.setup.rb.HsupaCellUpdate" | [59] "rab.rel.other.ps" |
| [24] "fail.setup.rb.HsupaConfigFail" | [60] "iuRelease.no.target.ps" |
| [25] "fail.setup.rb.HsupaNoReply" | [61] "iuRelease.target.unavail.ps" |
| [26] "fail.setup.rb.HsupaOther" | [62] "iuRelease.ho.inprogress.ps" |
| [27] "fail.setup.rab.cs.Radio" | [63] "iuRelease.RLFail.UePowerSaturated.ps" |
| [28] "fail.setup.rab.cs.signal" | [64] "iuRelease.ranap.reset.ps" |
| [29] "fail.setup.rab.cs.param" | [65] "rab.rel.utran.gen.cs" |
| [30] "fail.setup.rab.cs.transport" | [66] "rab.rel.cn.gen.cs" |
| [31] "fail.setup.rab.cs.NoResource" | [67] "rab.rel.other.cs" |
| [32] "fail.setup.rab.cs.other" | [68] "iuRelease.no.target.cs" |
| [33] "fail.setup.rab.ps.Radio" | [69] "iuRelease.target.unavail.cs" |
| [34] "fail.setup.rab.ps.signal" | [70] "iuRelease.ho.inprogress.cs" |
| [35] "fail.setup.rab.ps.param" | [71] "iuRelease.RLFail.UePowerSaturated.cs" |
| [36] "fail.setup.rab.ps.transport" | [72] "iuRelease.ranap.reset.cs" |

FIG. 5

| | lhs | rhs | support | confidence | lift |
|---|---|---|---|---|---|
| 1 | {rab.rel.utran.gen.ps} | => {releaseReq.iu.RLFail.ps} | 0.3248564 | 0.9974811 | 2.522675 |
| 2 | {drop.rab.ps} | => {releaseReq.iu.RLFail.ps} | 0.2748154 | 0.8459596 | 2.139470 |
| 3 | {rab.rel.utran.gen.ps} | => {drop.rab.ps} | 0.2592289 | 0.7959698 | 2.450220 |
| 4 | {fail.setup.rab.ps.signal} | => {releaseReq.iu.RLFail.ps} | 0.2296965 | 1.0000000 | 2.529046 |
| 5 | {fail.setup.rb.HsupaNoReply} | => {releaseReq.iu.RLFail.ps} | 0.2239541 | 0.9927273 | 2.510653 |
| 6 | {fail.setup.rb.HsupaNoReply} | => {fail.setup.rab.ps.signal} | 0.2214930 | 0.9818182 | 4.274416 |
| 7 | {rab.rel.other.ps} | => {releaseReq.iu.others.ps} | 0.2198523 | 0.9816850 | 3.923521 |
| 8 | {fail.setup.rab.ps} | => {releaseReq.iu.RLFail.ps} | 0.1936013 | 0.9874477 | 2.497300 |
| 9 | {fail.setup.rab.ps} | => {fail.setup.rab.ps.signal} | 0.1886792 | 0.9623431 | 4.189629 |
| 10 | {fail.setup.rab.ps} | => {fail.setup.rb.HsupaNoReply} | 0.1845775 | 0.9414226 | 4.173070 |
| 11 | {releaseReq.iu.others.ps} | => {drop.rab.ps} | 0.1755537 | 0.7016393 | 2.159844 |
| 12 | {rab.rel.other.ps} | => {drop.rab.ps} | 0.1689910 | 0.7545788 | 2.322807 |
| 13 | {fail.setup.rab.ps.signal} | => {rab.rel.utran.gen.ps} | 0.1681706 | 0.7321429 | 2.248066 |
| 14 | {fail.setup.rab.ps.signal} | => {drop.rab.ps} | 0.1640689 | 0.7142857 | 2.198773 |
| 15 | {fail.setup.rb.HsupaNoReply} | => {rab.rel.utran.gen.ps} | 0.1632486 | 0.7236364 | 2.221946 |
| 16 | {fail.setup.rb.HsupaNoReply} | => {drop.rab.ps} | 0.1575062 | 0.6981818 | 2.149201 |
| 17 | {fail.setup.rab.ps} | => {drop.rab.ps} | 0.1493027 | 0.7615063 | 2.344132 |
| 18 | {releaseReq.iu.others.ps} | => {releaseReq.iu.RLFail.ps} | 0.1484824 | 0.5934426 | 1.500843 |
| 19 | {fail.setup.rab.ps} | => {rab.rel.utran.gen.ps} | 0.1443806 | 0.7364017 | 2.261143 |
| 20 | {iuRelease.RLFail.UePowerSaturated.ps} | => {rab.rel.utran.gen.ps} | 0.1361772 | 1.0000000 | 3.070529 |

FIG. 6

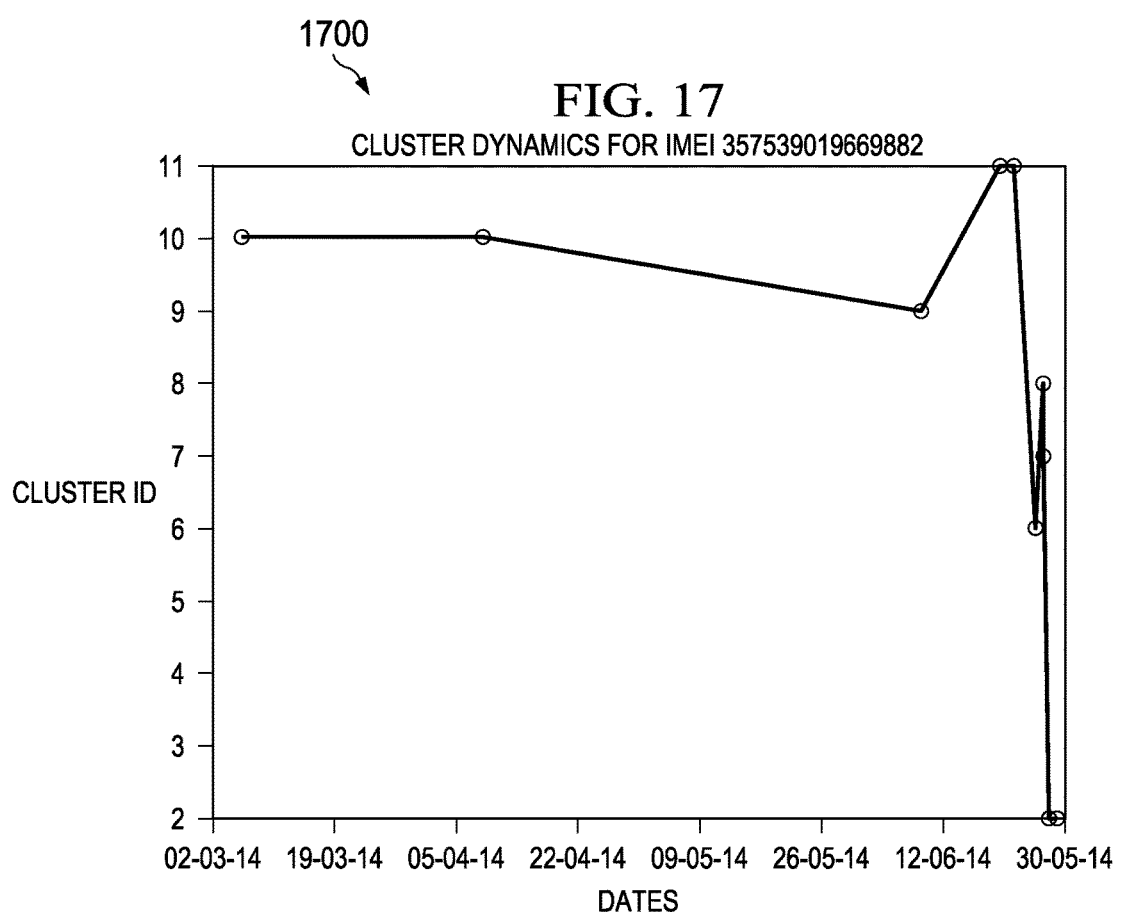

ASSOCIATION RULE ANALYSIS AND DATA VISUALIZATION FOR MOBILE NETWORKS

CROSS-REFERENCE TO RELATED APPLICATION

This application claims the benefit under 35 U.S.C. § 119(e) to U.S. Provisional Application Ser. No. 62/186,231 entitled "ASSOCIATION RULE ANALYSIS AND DATA VISUALIZATION FOR MOBILE NETWORKS" filed on Jun. 29, 2015, which is hereby incorporated by reference in its entirety.

TECHNICAL FIELD

This disclosure relates in general to the field of mobile networks and, more particularly, to association rule analysis and data visualization for mobile networks.

BACKGROUND

Wireless network communications have become increasingly important in almost every aspect of society. Various types of wireless networks (e.g., mobile networks) are utilized to facilitate wireless communications throughout the world. Examples of mobile networks include, but are not limited to, Global Systems for Mobile Communications (GSM), Universal Mobile Telecommunications System (UMTS), third generations (3G) and fourth generation (4G) of mobile telecommunications technology, and Long-Term Evolution (LTE). Typically, in a mobile network, a base station or access point (AP) collects event statistics in the form of performance counters and sends them to a network management system (NMS) for diagnostic purposes. These performance counters may be logged and maintained by the network management system in order to assess the performance of the mobile network. Due to the complexity of a typical mobile network, the number of performance counters can be very large and consequently, significant amounts of data may be generated. Analysis of this data is very difficult. A measurement report could potentially contain hundreds of counters, with each counter representing the number of occurrences of a specific event during a period of time, which may be configurable by a network operator. Typically, very few key performance indicators (KPIs) are used to monitor network performance. As a result, the vast amount of performance data is not fully utilized. Thus, network operators continue to face significant challenges in exploiting and analyzing data obtained from mobile networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a list of possible names for example key performance indicators (KPIs) of a mobile network according to at least one embodiment;

FIG. 6 is a list of possible association rules for a selected access point based on the KPIs shown in FIG. 5 according to at least one embodiment;

FIG. 17 is an example graph illustrating a cluster of the self-organizing map as a function of time for the selected access point, which could be created according to an embodiment of the present disclosure.

DETAILED DESCRIPTION OF EMBODIMENTS

Overview

Figures 1, 2:
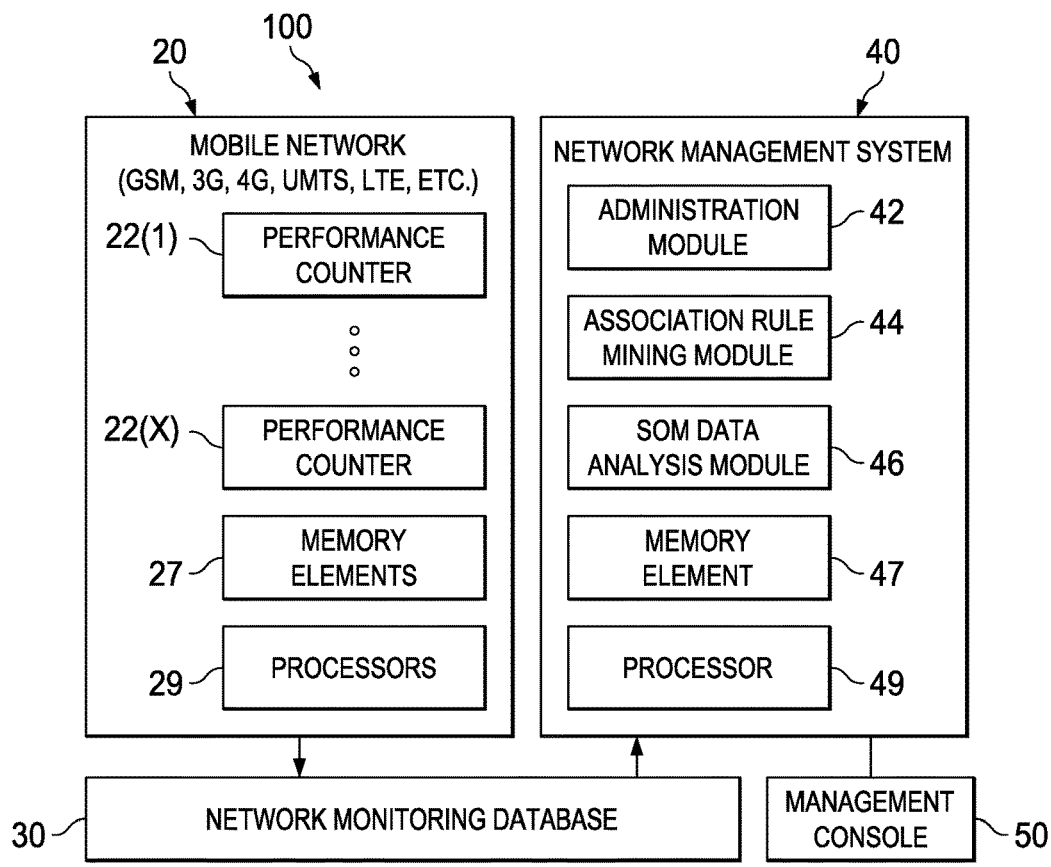
FIG. 1 is a simplified block diagram of an example network environment for analyzing network performance for a mobile network according to at least one embodiment of the present disclosure.
FIG. 2 is a possible table format for performance counter statistics for a mobile network according to at least one embodiment of the present disclosure.

The present disclosure describes methods of analyzing mobile network performance data. In one example, a method is provided in the present disclosure and includes converting a plurality of performance counters of a mobile network into a plurality of key performance indicators (KPIs), and quantizing each KPI into one value of a set of values associated with that KPI. The method also includes creating a set of items having multiple subsets corresponding to respective KPIs, where each item of a subset corresponds to a respective value of a particular set of values associated with a particular KPI. The method further includes, and generating association rules based, at least in part, on the set of items.

In specific embodiments, the quantizing the plurality of KPIs includes quantizing a first KPI into a first value of a set of three or more values associated with the first KPI. The set of items can include a subset of three or more items corresponding to the three or more values associated with the first KPI, where one item of the three or more items indicates the first value is present, and where other items of the three or more items indicate no other values of the three or more values are present. The three or more values can correspond to respective threshold levels of a performance target associated with the KPI. The respective threshold levels may be based on respective distribution factors applied to the performance target associated with the KPI. In some embodiments, the respective distribution factors are non-linear.

In specific embodiments, the set of items can be a binary representation of the quantized plurality of KPIs, and the generating the association rules includes applying association rule mining logic to the binary representation. In further specific embodiments, at least one KPI may be a function of a subset of one or more of the plurality of performance counters. In yet further embodiments, each of the plurality of performance counters can indicate a number of times a respective behavior has been detected in the mobile network.

The method may further include generating more association rules based, at least in part, on a second set of items associated with a selected proper subset of the plurality of KPIs and one or more child KPIs of the selected proper subset of the plurality of KPIs. At least one KPI in the proper subset of the plurality of KPIs can be based on an aggregate of a plurality of other KPIs. At least one child KPI can be associated with the at least one KPI, and wherein the at least one child KPI represents a specific type of failure in the mobile network.

In another embodiment for analyzing mobile network performance data, a method is provided in the present disclosure and includes determining one or more metrics of a feature in one or more clusters defined in a self-organizing map (SOM) based on performance counters of a mobile network. The method also includes identifying a particular cluster of the one or more clusters based on a metric associated with the particular cluster, and categorizing the particular cluster based, at least in part, on the feature. The determining the one or more metrics is based on one or more criteria of the feature.

In specific embodiments, the particular cluster may be identified based on the metric of the feature being maximized relative to metrics of the feature in other clusters of the one or more clusters. The metric can be a ratio based on a count of the feature in the particular cluster to a total count of the feature in the one or more clusters. The method may further include determining an optimal threshold for the feature, where the one or more criteria includes the optimal threshold. The optimal threshold may be computed to cause at least one cluster to be identified based on the feature and to cause at least one other cluster to not be identified based on the feature. The one or more performance counters may be converted to a key performance indicator (KPI) for the mobile network, wherein the feature corresponds to the KPI. Also, the feature can correspond to a performance counter. The method may also include identifying at least one other cluster of the one or more clusters based on the metric of the feature in the at least one other cluster. In more specific embodiments, the method may include determining a second metric of a second feature for the particular cluster, identifying a second cluster based on the second metric, and categorizing the second cluster based, at least in part, on the second feature. In yet further embodiments, the method may include ranking a set of key performance indicators to identify a subset of the key performance indicators to be used to generate the self-organizing map.

Some or all of the elements, operations, and features may be included in respective systems, apparatuses, and devices for performing the described functionality. Furthermore, some or all of the features may be implemented in at least one machine readable storage medium.

Description

FIG. 1 is a simplified block diagram of an example network environment 100 for analyzing mobile network performance data according to at least one embodiment. Network environment 100 can include a mobile network 20, a network management system 40, and a network monitoring database 30. Performance counters 22(1)-22(X) (referred to collectively herein as 'performance counters 22') are measurable metrics of mobile network 20 that can be logged and maintained by (or reported to) network management system 40 or stored in some other storage element or device, such as network monitoring database 30. Mobile network 20 also includes appropriate hardware, software, and firmware in various components and devices, including memory elements 27 and processors 29. Network management system 40 can be operably connected to mobile network 20, and may receive performance counters 22 directly, or via another element such as network monitoring database 30. Network monitoring system 40 can also include an administration module 42, a Self-Organizing Map (SOM) data analysis module 46, and an association rule mining module 44. Appropriate hardware, software, and firmware may also be provided including at least one memory element 47 and at least one processor 49. A management console 50 can also be suitably connected to, or otherwise in communication with (e.g., by a suitable network connection) network management system 40 to provide an interface for users such as Information Technology (IT) administrators, network operators, etc. to interact with SOM data analysis module 46 and association rule mining module 44 via, for example, administration module 42.

Elements of network environment 100 represent a series of points or nodes of interconnected communication paths for receiving and transmitting packets of information that propagate to and from the elements. Network environment 100 may include one or more networks and may be configured in any form including, but not limited to, local area networks (LANs), wide area networks (WANs) such as the Internet, wireless local area network (WLAN), metropolitan area network (MAN), Intranet, Extranet, WAN, virtual private network (VPN), or any other appropriate architecture or system that facilitates communications in a network environment. In some scenarios, network management system 40 may be provisioned in mobile network 20 (e.g., in a LAN), while in other scenarios, network management system 40 may be provisioned in some other network in communication with mobile network 20 or in a cloud network, for example. Network environment 100 may implement a UDP/IP connection and use a TCP/IP communication language protocol in particular embodiments of the present disclosure. In addition, any appropriate network elements (e.g., routers, gateways, switches, etc.) may be used to facilitate electronic communication between mobile network 20, network monitoring database 30, and network management system 40.

Mobile network 20 can include any type of mobile networks such as GSM, 3G/4G, UMTS, LTE, etc., which enables wireless network communications between nodes, networks, or a combination thereof. Mobile network 20 can be configured with numerous components and devices including, but not limited to, base transceiver stations, base station controllers, mobile switching center, and switching nodes. Due to the complexity of typical mobile networks, the number of performance counters 22(1)-22(X) in mobile network 20 may be very large. For example, hundreds of performance counters may be maintained and logged in some mobile networks. Performance counters can be used for various components and communications and can represent the occurrence of a specific event during a reporting period. A reporting period can be any desired period of time such as, for example, every 15 minutes, 20 minutes, 30 minutes, 45 minutes, hour, etc. Examples of performance counters can include, but are not limited to, packet switching (PS) dropped calls, circuit switching (CS) dropped calls, PS setup failure, CS setup failure, setup failure for specific reasons (e.g., radio link problems, etc.), Iu release requests, etc.

Network management system 40 of network environment 100 represents a server or other computing device that obtains performance counters 22 of mobile network 20. In at least one embodiment, network management system 40 may be part of mobile network 20 and can maintain and log performance counters 22. In at least one other embodiment, performance counters 22 may be fed to network monitoring database 30, which can be accessed by network monitoring system 40. Network monitoring database 30 could be provisioned in mobile network 20, in network management system 40, or in some other network (e.g., a cloud network) accessible by network management system 40 and mobile network 20. In other embodiments, performance counters 22 may be pushed (or pulled) directly to network management system 20. Essentially, any suitable configuration may be provided that allows network management system 40 to receive, retrieve, extract, pull, or otherwise obtain performance counters 22 of mobile network 20.

Embodiments of a system for analyzing mobile network performance may be implemented in network management system 40 using, for example, one or both of association rule mining module 44 and self-organizing map (SOM) data analysis module 46. Association rule mining module 44 provides logic for analyzing mobile network performance counters 22 using association rule mining techniques. The process can include selecting a set of desired performance counters, converting the set of counters into a set of Key Performance Indicators (KPIs), quantizing each KPI value into one of a set of possible values, and creating a new item set where each item within the set corresponds to a particular KPI associated with each of the possible quantized values. The item in which the KPI associates with the actual quantized value is considered present. Otherwise, the item is considered absent. In at least one embodiment, the item set can be a binary representation of the quantized KPIs and association rule mining can be applied to the binary representation to generate association rules. Hierarchical association rule mining may also be provided in which KPIs are grouped hierarchically in subsets from general and aggregated KPIs to KPIs describing detailed causes of events.

SOM data analysis module 46 in network management system 40 provides a process for analyzing mobile network performance counters 22 using SOM, clustering, and classification techniques. This process can include pre-processing performance data, using SOM to organize data on the basis of similarity, applying clustering techniques to group the similar patterns of data, and to automate the interpretation of the clusters by classifying and labeling the clusters in a meaningful way. The data analyzed using SOM can include raw data from performance counters as well as KPIs derived from the performance counters.

Management console 50 linked to network management system 40 may provide viewable data for network operators or other authorized users. Administration module 42 may be provided in network management system 40 to allow network operators or other authorized users to provide input to configure the systems for analyzing mobile network performance data. For example, network operators may select desired performance counters to be used in analyzing mobile network performance using association rule mining techniques or SOM data analysis. In addition, a network operator may configure thresholds to be used to evaluate KPIs when analyzing mobile network performance.

Association Rule Mining Data Analysis

For purposes of illustrating the process for analyzing mobile network performance using association rule mining, it is important to understand data related to mobile network performance. The following foundational information may be viewed as a basis from which the present disclosure may be properly explained. Such information is offered earnestly for purposes of explanation only and, accordingly, should not be construed in any way to limit the broad scope of the present disclosure and its potential applications.

To assess the performance of a mobile network such as GSM, UMTS and LTE, etc., performance counters can be logged and maintained by a network management system (NMS) (e.g., in an NMS database). Due to the complexity of a mobile network, the number of these performance counters is typically very large, and the analysis of the data can be very difficult. In a typical situation, a very few number of key performance indicators (KPIs) are used to represent the performance status of the network. As a result, the vast amount of data contained in the NMS database may not be fully utilized. If a network operator can exploit this vast amount of data more fully, more insights regarding the network behaviors can be obtained and extracted. These insights could also be very helpful in diagnosing network problems.

One technique for analyzing large amounts of data is association rule mining, which is a well-known method for discovering interesting relationships between variables in large databases. Association rule mining is typically used to analyze supermarket items (often called 'market basket analysis'). In a market basket analysis, many transactions are involved, and each transaction consists of a number of supermarket items from a vast number of items in a store. The goal of a market basket analysis is to figure out the possible associations among items. The outcome of the analysis allows the store manager to gain a better understanding of which items are often bought together, so that they can be marketed differently, or located strategically within the store.

In the market-basket problem, the aim is to discover interesting patterns, such as consumer buying behaviors, within transaction data from a large supermarket database. This transaction data typically comes from sources such as the point-of-sale (POS) systems where large quantities of transaction records are collected. The analysis of this transaction data is commonly known as market-basket analysis. The goal of market-basket analysis is to derive rules from the data in order to unveil unexploited opportunities. These rules are often known as the association rules. For example, if customers are buying items a, b, and c, and if it has been found that they are likely to buy item d, the retailer can then place item d accordingly in order to improve sells. Also, if observations a and b occur regularly with observations c and d, there may be a relationship between them, and it could be interesting to have further investigation. It is important to note that these rules identify the possible associations between items, but they do not necessarily imply causalities.

The table below shows an example of transaction data:

TABLE 1

| Transaction ID | Items |
|---|---|
| 1 | {milk, bread} |
| 2 | {milk, bread, beer, eggs} |
| 3 | {milk, bread, orange, cola} |
| 4 | {milk, orange, apple, lettuce} |
| 5 | {apple, orange, lettuce, cauliflower} |

The first column shows the transaction identity, and the second column corresponds to the items purchased for the respective transaction. For example, the retailer may want to know how likely the customer would be to buy apples if he/she also buys milk and oranges. Symbolically, {milk, orange} ⇒ {apple}.

More generally, let I be the entire set of items. A rule is defined as an implication of the form X⇒Y, where X,Y⊆I, and X∩Y=0. The item sets X and Y are called antecedent (left-hand-side, lhs) and consequent (right-hand-side, rhs) of the rule. Two of the well-known constraints are minimum thresholds on 'supports' and 'confidence'. The methods for finding association rules are well-known. Association rules extraction procedure can include two phases. In the first phase, the frequent item-sets are found, and, in the second phase, the rules are derived from these item-sets.

It is important to note that the association rule mining generally involves the consideration of only the presence or absence of an item within a transaction. For example, for transaction 1 in TABLE 1, only the presence of milk and bread is considered. However, traditional association rules do not consider the number of cartons of milk and/or loaves of bread, for instance. A modified representation of the transaction data is shown in TABLE 2, where 0 and 1 imply the absence and presence of the item respectively:

TABLE 2

| Trans. ID | Items | | | | | | | | |
|---|---|---|---|---|---|---|---|---|---|
| | Milk | Bread | Beer | Eggs | Orange | Cola | Apple | Lettuce | Cauliflower |
| 1 | 1 | 1 | 0 | 0 | 0 | 0 | 0 | 0 | 0 |
| 2 | 1 | 1 | 1 | 1 | 0 | 0 | 0 | 0 | 0 |
| 3 | 1 | 1 | 0 | 0 | 1 | 1 | 0 | 0 | 0 |
| 4 | 1 | 0 | 0 | 0 | 1 | 0 | 1 | 1 | 0 |
| 5 | 0 | 0 | 0 | 0 | 1 | 0 | 1 | 1 | 1 |

Additional methods may take into account the strength of the presence of each item. These extended rules, which take into account the strength of the presence of the items, are termed as Weighted Association Rules. Generally, these approaches involve quantizing the counters into B bins, and expand the original number N of items into a new set of B×N items. An example of transaction data with weights is showing in Table 3:

TABLE 3

| Trans. ID | Items | | | |
|---|---|---|---|---|
| | Milk | Bread | ... | Cauliflower |
| 1 | 2 | 5 | ... | 0 |
| 2 | 2 | 3 | ... | 0 |
| 3 | 3 | 2 | ... | 0 |
| 4 | 3 | 0 | ... | 0 |
| 5 | 0 | 0 | ... | 2 |

The application of this technique in commercial data mining, however, does not readily translate in analyzing network performance counters. One problem with traditional association rule mining techniques is that only the presence or absence of an item is considered. However, in a network performance counter database, a reporting period may include hundreds of counters, and each counter can represent the number of occurrences of a specific event during the period. Thus, it is not merely the presence or absence of the event, but the frequency of occurrence of such event that is important.

A system for analyzing mobile network performance data using association rule mining techniques, as outlined in network environment 100 of FIG. 1, can resolve these (and other) issues. This system uses association rule mining to analyze wireless network performance KPIs. Due to the vast number of counters available, it may be important to target a specific set of counters based, at least in part, on the nature of the analysis. Therefore, a set of performance counters may be selected first. The performance counters may be relevant to an objective of a study of the network performance. Second, the set of counters can be converted into a set of Key Performance Indicators (KPIs). Third, each KPI value can be quantized into one of a set of possible values that are derived from a certain performance requirement or performance target associated with this particular KPI. Finally, a new item set can be created where each item within the set corresponds to a particular KPI associated with each of the possible quantized values. An item, in which a corresponding KPI associates with an actual quantized value, is considered present. Otherwise, the item is considered absent. After applying this procedure for entire data set, the result is ready for standard association rule mining (e.g., market-basket analysis).

The system also enables hierarchical association rule mining, in which KPIs are grouped hierarchically from general and aggregated KPIs to KPIs describing detailed causes of events. In this way, relevant KPIs that are of particular interest to the operator or those that are particularly problematic can be progressively isolated. Subsequently, rules associated with the causes of the presence of these KPIs can then be extracted. This approach is particularly useful if a very large database is involved.

The system for analyzing mobile wireless network performance data using association rule mining offers numerous advantages. First, the system allows standard association rule mining techniques to be used in mobile network performance data analysis. Association rules among KPIs can be systematically created. Based on these rules, the hidden relationships among KPIs can be revealed. Subsequently, the causes of specific problems can be discovered in an automated way. KPIs are typically analyzed individually without being considered in a broader context together with many other KPIs as a whole. This system can significantly reduce the efforts of network diagnosis and trouble-shooting, while also providing a succinct way of visualizing data in order to discover hidden behaviors of a network irrespective of the existence of any problem. In addition, the currently under-utilized network performance data can be fully exploited by the system.

Turning to FIG. 2, FIG. 2 illustrates a table format 200 that may be used for analyzing performance counter statistics for a mobile network when using association rule mining. Columns 210 represent performance counters, and rows 220 represent reporting intervals. Typically, in a mobile network, a vast number of performance counters are generated and stored in the network monitoring database (e.g., NMS database). Traditional association rules extraction procedures are not useful for analyzing network performance counters due to the assumption of the binary nature of the items (e.g., item is present=1, item is not present=0). However, the analysis of these performance counters can be mapped to methods for analyzing market basket problems with weighted association rules. An example of the performance counter statistics is shown in FIG. 2, wherein each entry $m_{1,1}$ through $m_{1,N}$, represents a number of events detected for a particular reporting interval, where the events correspond to a particular wireless network performance counter. For example, if 15 dropped calls are detected in 15 minutes, reporting interval 1 could correspond to the 15 minute interval, Counter 1 could correspond to dropped calls, and entry $m_{1,1}$ could equal 15. By analyzing these performance counters, the network operator can diagnose problems in the network, and quantify the level of performance of the network at any given point in time.

Figure 3:
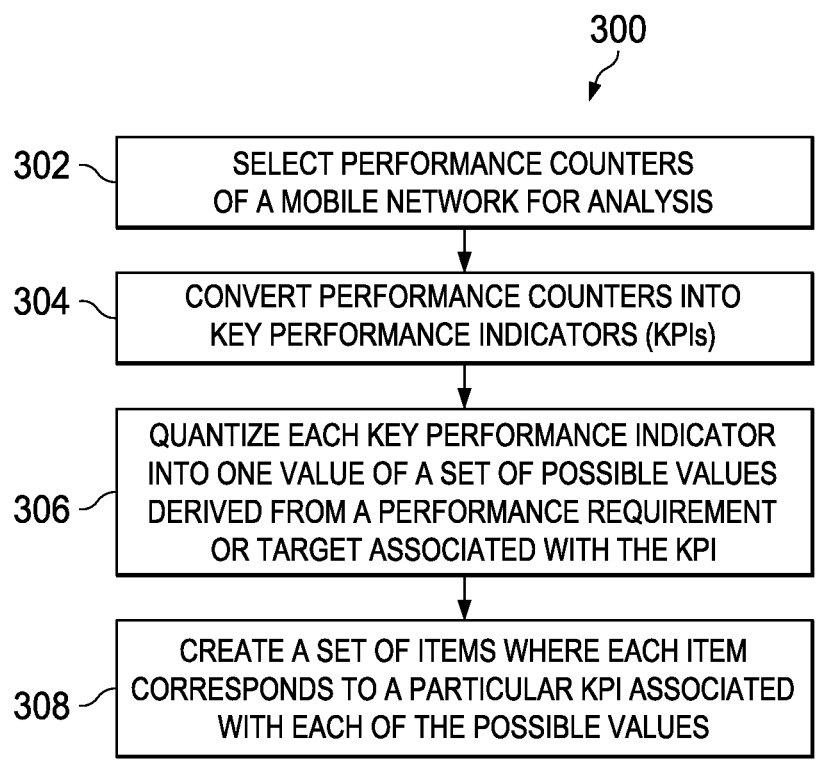
FIG. 3 is a simplified flowchart illustrating possible operations related to analyzing mobile network performance according to at least one embodiment.

Turning to FIG. 3, FIG. 3 is a simplified flowchart of a possible flow 300 of operations that may be associated with at least one embodiment described herein for analyzing mobile network performance data using association rule mining techniques. A set of operations corresponds to the activities of FIG. 3. A network management system (e.g., 40) may comprise means, such as at least one processor (e.g., 49) for performing the operations. In at least one embodiment, at least some of the operations of flow 300 may be performed by an association rule mining module (e.g., 44). Flow 300 can convert the network performance counter statistics of a mobile network into a binary representation of key performance indicators (KPIs) corresponding to the performance counter statistics.

At 302, performance counters 22 may be selected for analysis. For at least some example mobile networks, a network monitoring database (e.g., 30) may contain hundreds of counters. Depending on the nature of the analysis or investigation into a particular problem, not all counters are useful. Therefore, initially, a determination can be made as to which performance counters are to be included in the analysis. Raw performance counters, however, may not provide context as to how good the mobile network is performing. Therefore, key performance indicators (KPIs) derived from the raw counters can be used in the analysis. Thus, performance counters may be selected based on their correspondence to the desired KPIs. In at least one embodiment, a network operator may select the desired performance counters 22 depending on the particular analysis being performed.

In some embodiments, performance counters may be selected by a user (e.g., network operator) based on particular needs or preferences. For example, the selected performance counters may focus on a particular access point in the mobile network that is experiencing problems. When a user selects the performance counters, the network monitoring system may receive an indication of which performance counters have been selected for association rule mining by the user. In some other embodiments, performance counters may be automatically selected for example, based on policies.

At 304, the selected performance counters may be converted into KPIs using, for example, some pre-defined formulas. In at least some instances, a single KPI can be a function of a subset of counters. Also, some form of post-processing may also be performed. For example, consider the ratio between counters $X_1$ and $X_2$ (i.e., $X_1/X_2$). If there have not been any activities related to these counters, they are likely to be zero. Thus, their ratios would then take on "missing values", (i.e., Not Available (NA)). How to process NA values may depend on the nature of the KPIs. If KPI $Y_1=X_{1,1}/X_{1,2}$ is related to failure of a specific feature (e.g., call drop rate), and if counters $X_{1,1}$ and $X_{1,2}$ are zero, it is reasonable to set the call drop rate to be zero due to the lack of activities. However, if the KPI is related to the success of a specific feature (e.g., call success rate), it would be counter-intuitive to set the value to 1 when the related counters are zero. In at least one embodiment, this may be addressed by selecting failure-related KPIs as performance measures. Success-related KPIs can be selected as performance measures by expressing a corresponding group of counters as failure-related KPIs. For example, if N1 is a success count, and N2 is the total count, then the failure count can be (N2−N1)/N2.

At 306, each KPI may be quantized into one value of a set of possible values derived from a performance requirement or performance target associated with the particular KPI. Each value of the set of possible values can correspond to a respective threshold level (e.g., exact number, exact percentage, range of numbers, or range of percentages, etc.) of the performance requirement or target associated with the KPI. Thus, a single KPI can be expanded into multiple levels associated with different values.

At 308, a set of items (or 'item set') can be created where each item within the set corresponds to a particular KPI associated with each of the possible values. More specifically, the item set can have multiple subsets of items where each subset corresponds to a different KPI. Each item within a subset can correspond to the same KPI, but a different one of the quantized values associated with the KPI. If a KPI of a data set being evaluated is quantized to a particular value, then an item corresponding to the KPI and the particular value is considered present. Other items in the subset are considered absent (i.e., any item corresponding to the KPI and another one of the quantized values).

For example, let $\hat{Y}=(\hat{Y}_1, \hat{Y}_2, \ldots, \hat{Y}_N)$ be a vector of failure requirements for KPIs $Y_t=(Y_{t,1}, Y_{t,2}, \ldots Y_{t,N})$ at reporting interval t. One way to categorize the KPIs is based on a binary classification function $\rho(x,y)$ as follows:

$$\rho(\hat{Y}_i, Y_{t,i}) = \begin{cases} 0, & Y_{t,i} \leq \hat{Y}_i \\ 1, & Y_{t,i} > \hat{Y}_i \end{cases},$$

$$t = 1, 2, \ldots T, i = 1, 2, \ldots N$$

With this formula, if the KPI is above a certain threshold, then it is considered present, but if the KPI is below or equal to that threshold, then it is considered absent.

At least some embodiments can be generalized by creating more levels of classifications. For example, the following formula may be used to create four levels of classifications:

$$\rho(\hat{Y}_i, Y_{t,i}) = \begin{cases} 0, & 0 < Y_{t,i} \leq a_{i,0}\hat{Y}_i \\ 1, & a_{i,0}\hat{Y}_i < Y_{t,i} \leq a_{i,1}\hat{Y}_i \\ 2, & a_{i,1}\hat{Y}_i < Y_{t,i} \leq a_{i,2}\hat{Y}_i \\ 3, & a_{i,2}\hat{Y}_i < Y_{t,i} \end{cases},$$

$$t = 1, 2, \ldots T, i = 1, 2, \ldots N$$

If $a_{i,0}=0.5$, $a_{i,1}=0.8$, $a_{i,2}=1.2$, then assuming that the target $\hat{Y}_i<1$, we can interpret the above to be "low" failure rate if the KPI is between 0 and 50% of the target, "medium" if the KPI is between 50% and 80% of the target, "high" if the KPI is between 80% to 120% of the target, and "extremely high" if the KPI is larger than 120% of the target.

More generally, a KPI can be quantized into an arbitrary number of threshold or classification levels as:

$$\rho(\hat{Y}_i, Y_{t,i}) = \begin{cases} 0, & 0 < Y_{t,i} \leq a_{i,0}\hat{Y}_i \\ 1, & a_{i,0}\hat{Y}_i < Y_{t,i} \leq a_{i,1}\hat{Y}_i \\ 2, & a_{i,1}\hat{Y}_i < Y_{t,i} \leq a_{i,2}\hat{Y}_i \\ \vdots & \vdots \\ K, & a_{i,K-1}\hat{Y}_i < Y_{t,i} \end{cases},$$

$$t = 1, 2, \ldots T, i = 1, 2, \ldots N$$

The way the quantization is done is characterized by distribution factors $a_{i,0}, a_{i,1}, \ldots, a_{i,K-1}$. As these factors are not restricted to take on a linear relationship, the operator can optimize their values which suit a particular contextual requirement.

In at least one embodiment, an item set can be created as a binary representation of the quantized KPIs, and association rule mining techniques can be used on the binary representation to obtain meaningful data related to mobile network performance. In order to put the above framework in the context of a binary representation, KPI i (i.e., $Y_{t,i}$) is to be converted to the presence or absence of $\rho(Y_i,Y_{t,i})=v$, where v=0, 1, 2, 3. For example, if $\rho(Y_i,Y_{t,i})=0$ exists for KPI $Y_{t,i}$ at reporting period t, then $\rho(Y_i,Y_{t,i})=1, 2, 3$ would not exist, as they are mutually exclusive. Similarly, if $\rho(Y_i,Y_{t,i})=1$ exists for KPI $Y_{t,i}$ at reporting period t, then $\rho(Y_i,Y_{t,i})=0, 2, 3$ would not exist, and so on for each quantized value of KPI $Y_{t,i}$ at any reporting interval. This approach transforms the multi-value KPI problem into a binary problem. This can be analyzed by well-known association rule methodologies such as Apriori algorithm and Equivalence Class Transformation (Eclat) algorithm, which are used in market basket analysis.

Figure 4:
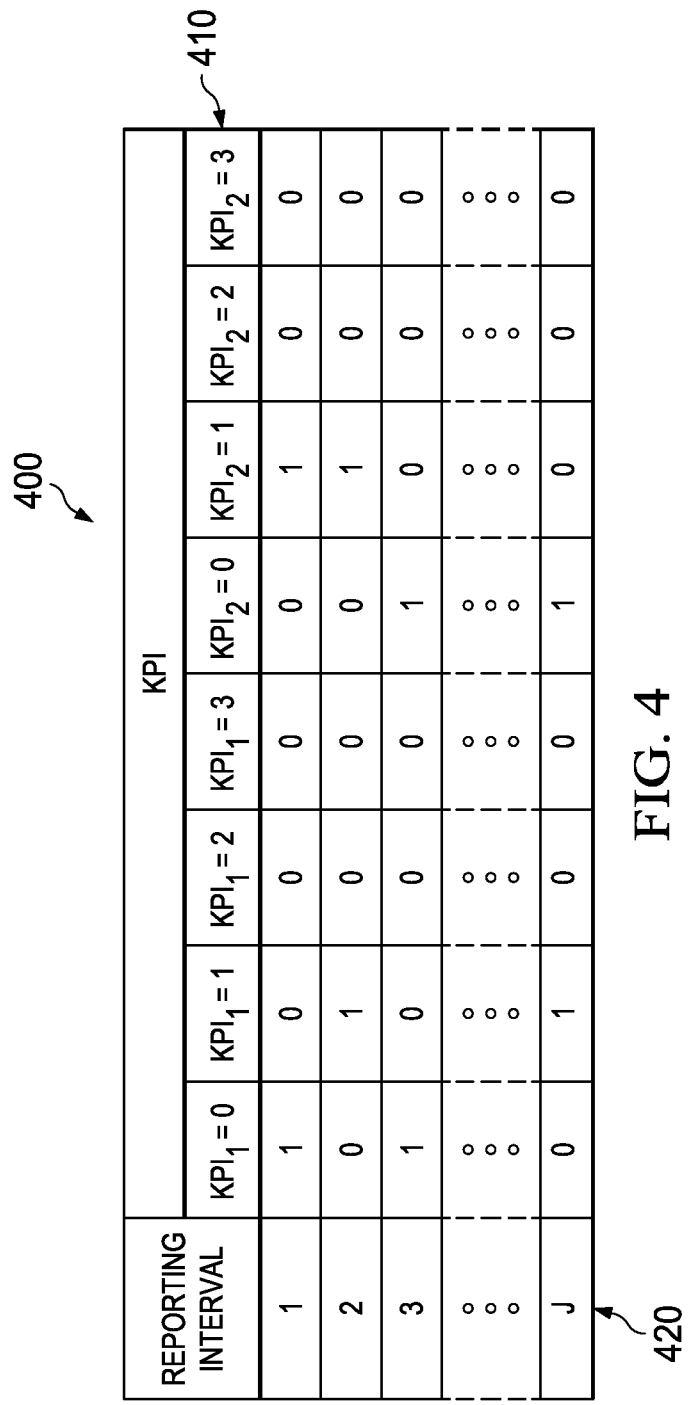
FIG. 4 is an example table containing a binary representation of possible multi-value key performance indicators (KPIs) of a mobile network based on an example scenario according to at least one embodiment.

An example of a binary representation of multi-value KPI problem is shown in FIG. 4, which shows a table 400 with columns 410 of KPIs and rows 420 of reporting intervals. Table 400 includes data for two KPIs, and each KPI is expanded into four levels, which correspond to four possible quantized values of the KPI. The data in each row (e.g., binary 1s and 0s) can represent a set of items having two subsets. For example, data in a first set of items (e.g., the first row at reporting interval 1) that corresponds to $KPI_1$ is one subset of the first set of items and data that corresponds to $KPI_2$ is another subset of the first set of items. As the problem is now binary, a standard Apriori or Eclat algorithm can be used to mine association rules.

An illustrative example is now presented. Example data for a mobile network (e.g., 3G femto network) over a 4-month period, or reporting interval, is provided for the illustration. In this example, only performance counters deemed relevant for obtaining some representative performance indicators have been selected for use as Key Performance Indicator (KPIs).

FIG. 5 is a listing 500 of the names of the 72 KPIs used in this illustration. The first two KPIs 1-2 are related to the Radio Access Bearer (RAB) setup failure for circuit-switched (CS) and packet-switched (PS) bearers respectively. KPIs 3-4 are related to RAB drop rate for CS and PS respectively. KPIs 5-8 are related to intra- and inter-radio access technology (RAT) for CS and PS bearers. In this illustration, a binary quantization is used. The failure requirements for the first 8 KPIs are $\hat{Y}_1=\hat{Y}_2=\ldots=\hat{Y}_8=0.05$. KPIs 9 to 38 are related to setup failures with specific reasons. Others are diagnostic KPIs related to Radio Resource Control (RRC) failure, Iu release requests, Iu release, RAB release, etc. For example, KPI 27 responds to the RAB setup failure for CS bearer due to the radio link problems. KPI 37 is related to the RAB setup failure for PS bearer due to the lack of resources, while KPI 71 corresponds to the release of the Iu interface due to radio link failure caused by user equipment (UE) power saturation. As KPIs 9-72 are diagnostic sub-KPIs for an aggregated failure, there are multiple causes for one failure type. Thus, the corresponding requirements are smaller than their aggregated counterpart. In at least one embodiment, the requirement of a sub-KPI can be set to be the requirement of a KPI divided by the number of the associated sub-KPIs. However, for convenience and simplicity of this illustration, the requirements are set to $\hat{Y}_9=\hat{Y}_{10}=\ldots=\hat{Y}_{72}=0.01$.

FIG. 6 is a listing 600 of the first twenty association rules for a selected access point (AP) sorted according to their support values. In addition, their confidence and lift values are also shown. The support of a rule $\{A\}\rightarrow\{B\}$ is $P(A \cup B)$. In other words, the higher the support is, the more often the antecedent and the consequent happen together. On the other hand, the confidence of the same rule is $P(B|A)$, which is essentially the conditional probability of B given A. As expected, the higher the confidence is, the higher the chance that item B appears in the presence of A. The lift is defined as $P(A \cup B)/(P(A)P(B))$. Lift is a measure of the performance of the association rule at predicting the outcome with respect to the entire data population, as compared to a random choice.

As can be seen in FIG. 6 at 602, there is a strong relationship between PS drop call and Iu release request due to radio link (RL) failure. It is generated based on the support and confidence limits of 0.1 and 0.5 respectively. Also, it is apparent, based on 602 and 608, that Iu release request due to UE power saturation seems to be one of the reasons RL failure occurs, which is part of the UTRAN generated reasons for the RAB releases. Based on this observation, it can be concluded that many of the dropped calls can be attributed to RL failures. Note that there are many sub-reasons within RL failures. As shown at 602 and 608 in FIG. 6, one sub-reason for RL failure is due to the UE power saturation. Note that there seems to be a strong association between PS call drop and Iu release request due to other reasons, as indicated at 604. This corresponds to any other reasons for Iu Release request that are not covered by association rule: at 606.

Generally, a strong association may reduce the effort of isolating the source of a problem in a mobile network. Also, although the association analysis in this illustration is performed on an individual AP basis, it will be apparent that the approach can be equally valid for the analysis of the entire network, or a subset of components in the network.

Figure 7A:
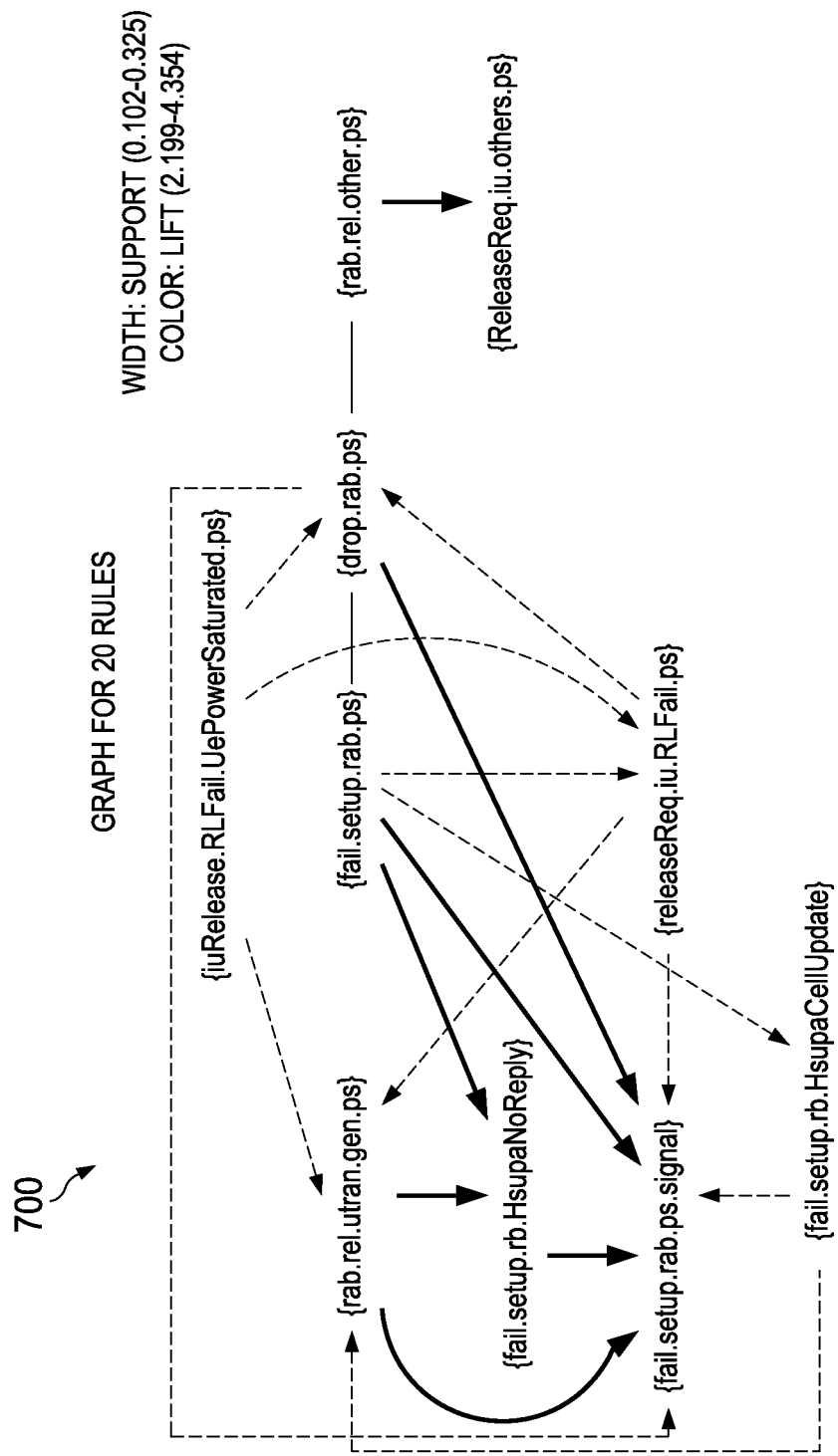
FIG. 7A illustrates a possible association rule graph for the selected access point based on the association rules of FIG. 6, which could be created according to at least one embodiment.

FIG. 7A is an example rule graph 700 for a selected access point, which may be generated according to at least one embodiment. Rule graph 700 provides a graphical representation of the twenty association rules of FIG. 6. Although analysis has been done on a per-AP basis, it is possible to perform the analysis across the entire network. It is also possible to break down the KPIs into groups such that each group represents a similar pattern of KPI characteristics.

Figure 7B:
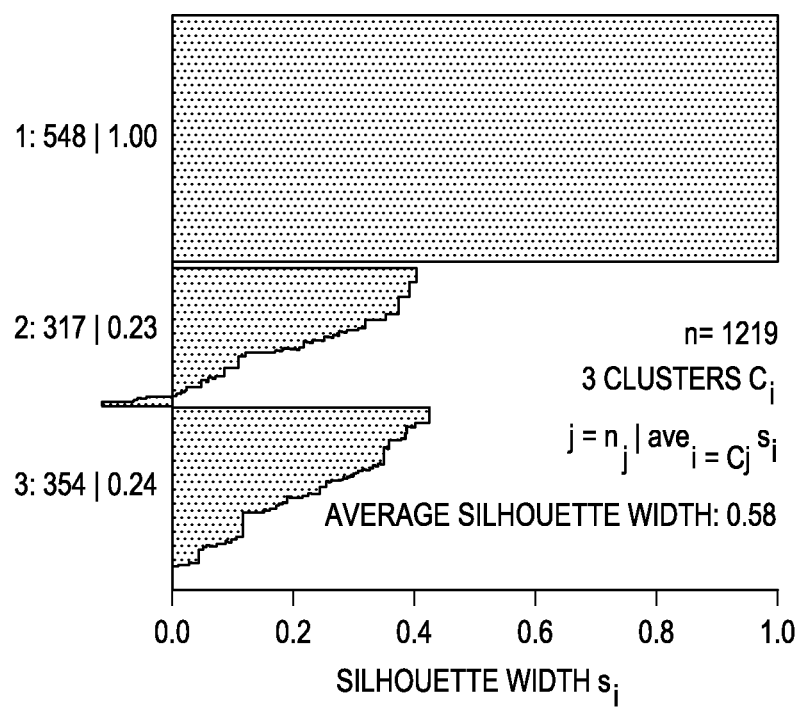
FIG. 7B is an example silhouette plot for the selected access point based on the association rules of FIG. 6, which could be created according to at least one embodiment.

FIG. 7B is an example silhouette plot 720 for the selected access point, which may be generated according to at least one embodiment. In plot 720, the data has been divided into three clusters. The percentages of data corresponding to cluster 1 to 3 are 45.0%, 26.0%, and 29.0%. The silhouette represents the "compactness" of each cluster. The larger the silhouette width a cluster has, the better the object belongs to the assigned cluster. It can be seen that the silhouette width is relatively large, which shows that the clusters are well-formed.

Figure 7C:
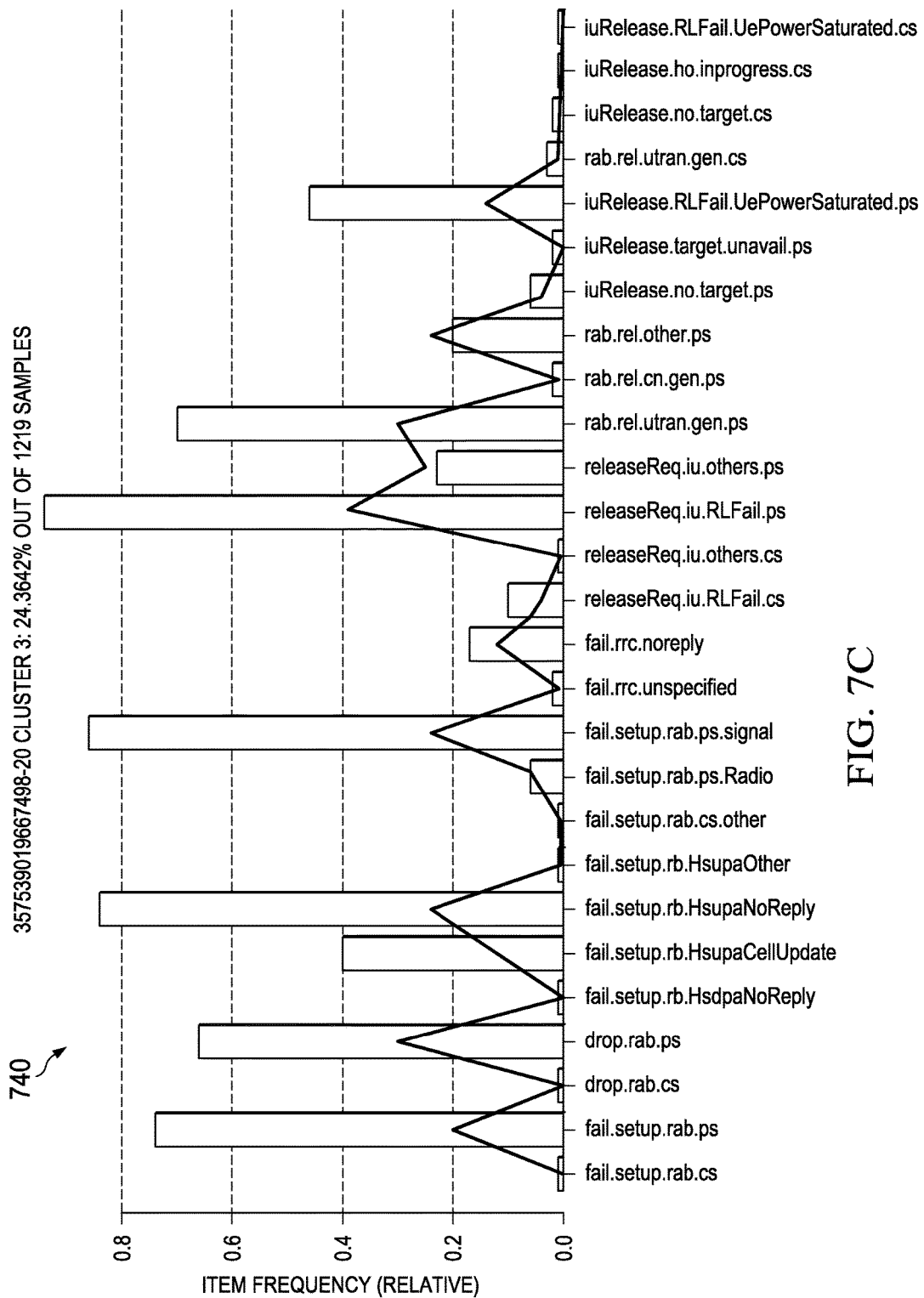
FIG. 7C is an example frequency plot for a cluster shown in FIG. 7B of the selected access point, which could be created according to at least one embodiment.

FIG. 7C is an example representative item frequency plot 740 for cluster 3 of the selected access point, which may be generated according to at least one embodiment. The support limit is 0.001. The bars represent the relative frequency of the KPIs in the cluster, while the line represents average frequency in the entire data set. Note that a large difference between the data set and the cluster implies that there is a strong cluster-specific behavior. Cluster 3 plotted in frequency plot 740 corresponds to a case that includes both PS drop calls and RAB setup failures. Frequency plot 740 can be very useful to see the relative frequencies of the KPIs.

In at least some embodiments, hierarchical association rule mining may be used in the system for analyzing mobile network performance. In hierarchical association rule mining of wireless networks, KPIs can be grouped hierarchically from general and aggregated KPIs to KPIs that describe detailed causes of events. Accordingly, KPIs that are of particular interest to a network operator or KPIs that are particularly problematic can be progressively isolated.

Figure 8A:
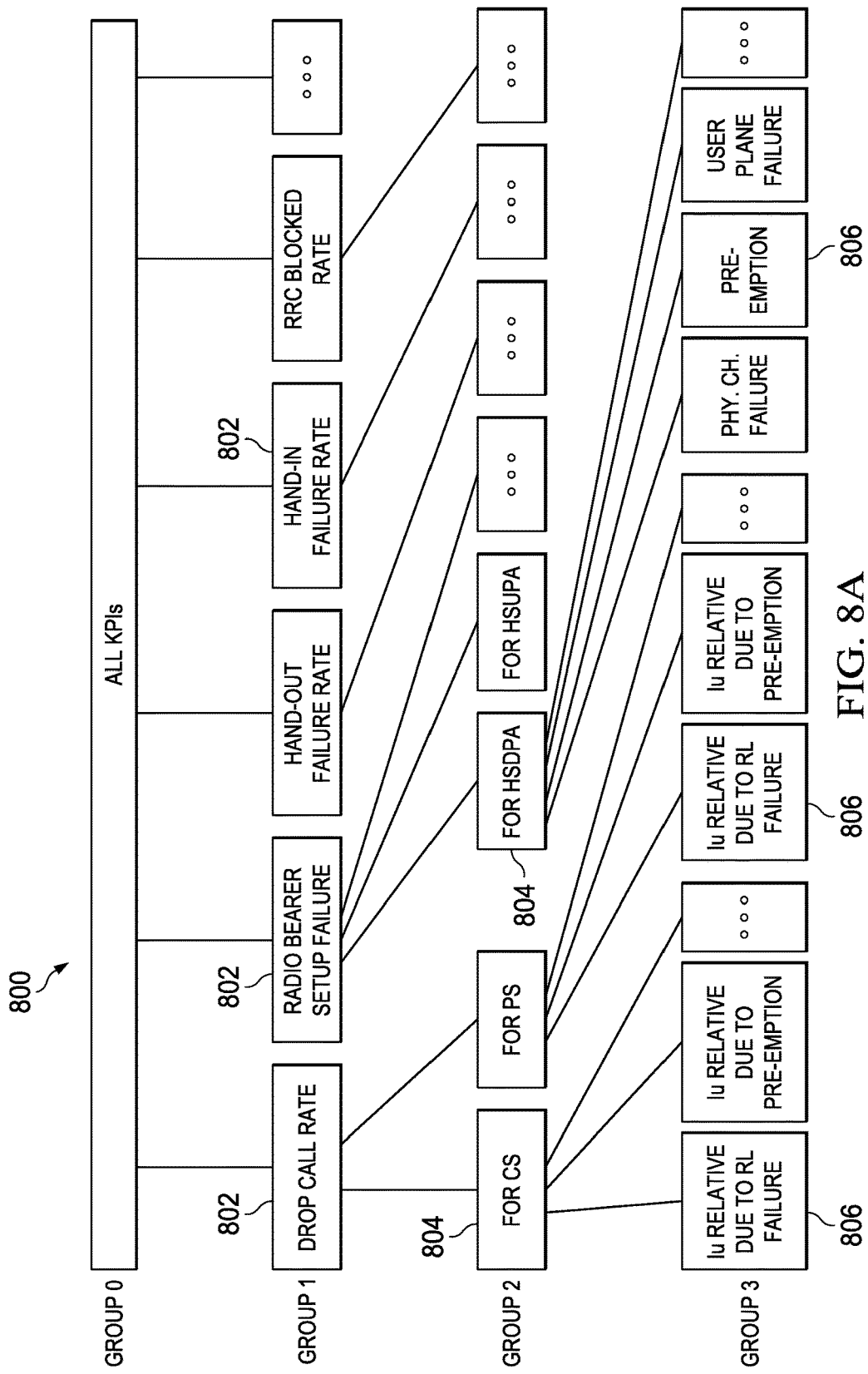
FIG. 8A is an example hierarchical key performance indicator (KPI) structure according to at least one embodiment.
Figure 8B:
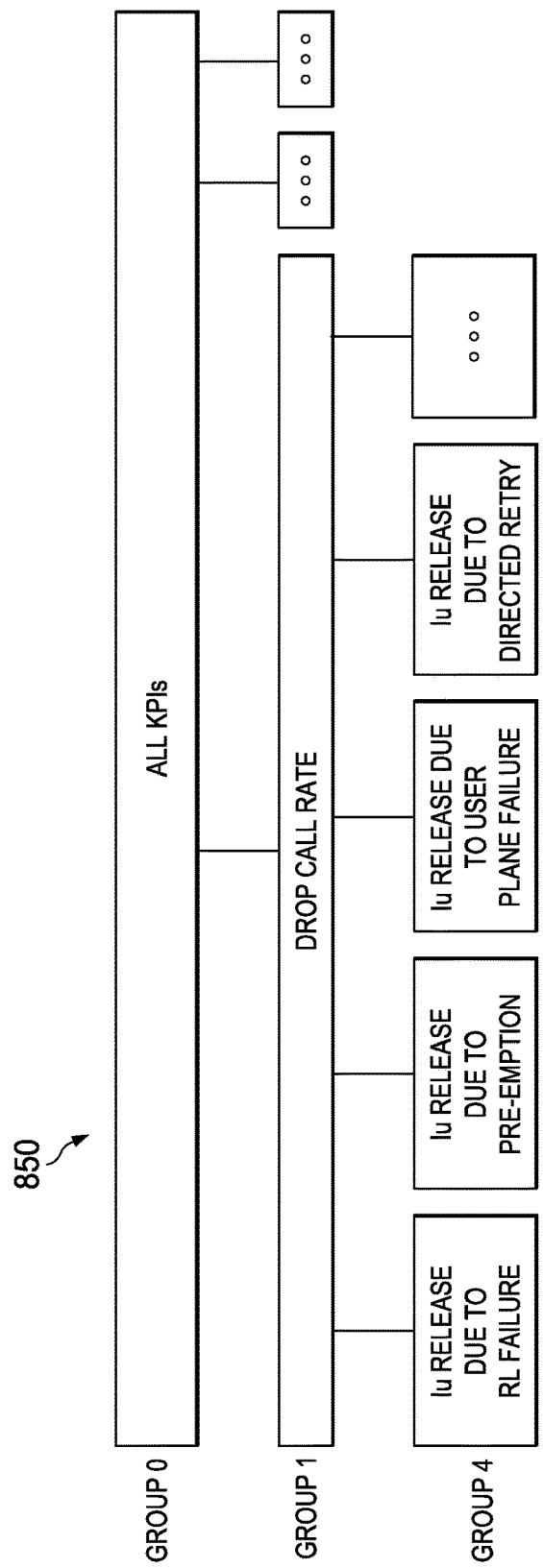
FIG. 8B is an example reduced hierarchical KPI structure according to at least one embodiment.

Turning to FIGS. 8A and 8B, graphical representations of hierarchical key performance indicator (KPI) structures 800 and 850 are illustrated, respectively. Hierarchical KPI structures 800 of FIG. 8 shows a graphical representation of a hierarchical key performance indicator (KPI) structure 800 for KPIs associated with performance counters of an example mobile network. When a very large number of KPIs are used, interpreting the mined association rules can be more cumbersome. It is possible to create a hierarchical data visualization strategy, such that the system for analyzing mobile network performance using association rules can be applied to multiple levels of KPIs, as shown in FIG. 8. While there may be many KPIs (e.g., hundreds), and the database may continue to grow, it is possible to group these KPIs into clusters. For example, there are KPIs 802 that describe the aggregate performance of the network, such as call drop rate, RAB setup failure rate, hand-out failure rate, hand-in failure rate, RRC blocked rate, etc. These KPIs 802, (group 1 KPIs) are based on aggregate of sub-counters such as call drop counts for voice, call drop counts for video, etc., from which group 2 KPIs such as call drop rate for voice and video can be separately computed. Each KPI 804 of group 2 is a child node (or child KPI) of one of the KPIs 804 of group 1. Similarly, RAB setup failure rate (group 1 KPIs) can be decomposed into RAB setup failure rate for CS voice, CS video, PS interactive, PS background, PS streaming, etc. (group 2 KPIs). A similar approach can be applied to other group 1 KPIs. It should be noted that for ease of illustration, reference numbers for KPIs in a particular group (e.g., group 1, group 2, group 3) are not indicated on every node of the group, but rather, a selected few nodes of the group.

In a similar manner, group 2 KPIs can be decomposed into cause-specific KPIs 806 (group 3 KPIs), each of which is a child node (or child KPI) of one of the KPIs 804 of group 2. For example, radio bearer setup failure (group 1 KPI) may be decomposed into radio bearer setup failure for HSDPA (group 2 KPI). This, in turn, can be decomposed into radio bearer setup failure for HSDPA due to 1) physical channel failure, 2) protocol error, 3) cell update, 4) configuration failure, 5) no reply, and 6) other. These cause-specific KPIs 806 can be classified as group 3 KPIs for convenience. Similarly, call drop rate (group 1) can be decomposed to call drop rate for CS and PS (group 2), which, in turn, are related to group 3 KPIs such as Iu release request rate for CS due to 1) radio link failure, 2) pre-emption, 3) user plane failure, 4) directed retry, 5) OAM intervention, and 6) other.

If bearer-specific differentiation is not necessary, it is possible to decompose some group 1 KPIs into cause-specific KPIs 856 directly (e.g., group 4 KPI). For example, call drop rate (group 1) can be decomposed directly into call drop rate due to 1) radio link failure, 2) pre-emption, etc., which are aggregated over both CS and PS services as shown in a reduced hierarchical KPI structure 850 in FIG. 8B.

Figures 9A, 9B:
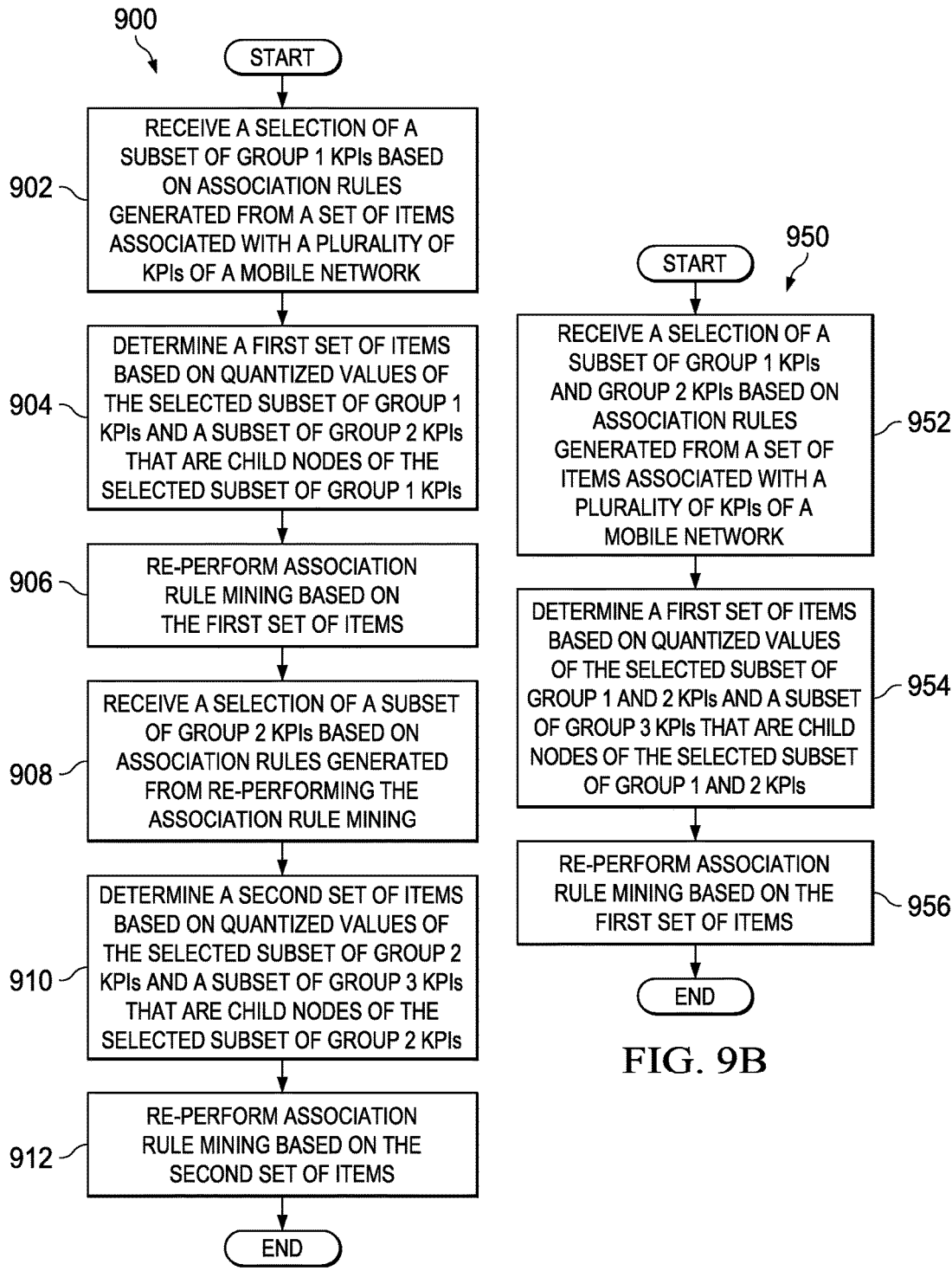
FIGS. 9A and 9B are a simplified flowcharts illustrating possible operations related to hierarchical association rule mining according to at least one embodiment of the present disclosure.

In this framework, it is possible to control the resolution of the KPIs' visualization and association rule mining. This is especially useful when the number of KPIs is very large. Turning to FIGS. 9A and 9B, simplified flows 900 and 950, respectively, show possible operations that may be associated with at least one embodiment described herein for analyzing mobile network performance data using hierarchical association rule mining techniques. A set of operations corresponds to the activities of FIG. 9A. A network management system (e.g., 40) may comprise means, such as at least one processor (e.g., 49) for performing the operations. In at least one embodiment, at least some of the operations of flow 900 may be performed by an association rule mining module (e.g., 44). For ease of illustration, FIG.

9A will be described with reference to the hierarchical key performance indicator (KPI) structure 800 of FIG. 8A.

Initially, when performing an analysis of a mobile network using association rule mining techniques, an initial set of as many relevant group 1 KPIs as possible can be included and association rule mining can be applied to the initial set of KPIs as previously described herein. In one example, the initial set of KPIs may include any or all of the KPIs of an access point (or multiple access points) of the mobile network. At 902, the network management system may receive a selection of a subset of group 1 KPIs. In one example, the most relevant KPIs may be selected based on analysis of association rules resulting from association rule mining applied to the initial set of KPIs. This selection may be received from a user (e.g., a network operator) or may be preconfigured based on policies applied to the association rules.

At 904, a first set of items based on quantized values of the selected subset of group 1 KPIs may be determined. This first set of items may also be based on quantized values of a subset of group 2 KPIs that are child nodes of the selected subset of group 1 KPIs. This first set of items may be created, generated and/or identified from a set of items created for the initial set of relevant group 1 KPIs of the mobile network. At 906, association rule mining is re-performed based on the first set of items At 908, the network management system may receive a selection of a subset of group 2 KPIs. In one example, the most relevant KPIs may be selected based on analysis of the association rules resulting from association rule mining applied to the first set of items. This selection may be received from a user (e.g., a network operator) or may be preconfigured based on policies applied to the association rules generated from the association rule mining applied to the first set of items.

At 910, a second set of items based on quantized values of the selected subset of group 2 KPIs may be determined. This first set of items may also be based on quantized values of a subset of group 3 KPIs that are child nodes of the selected subset of group 2 KPIs. This second set of items may be created, generated and/or identified from the set of items created for the initial set of relevant group 1 KPIs of the mobile network. At 912, association rule mining is re-performed using the second set of items. These operations can be repeated for a higher group number depending on the availability of the KPIs. When the association rule mining is applied to the last two levels in the hierarchy, the possible causes of dominant service-specific failures can be isolated.

The outcome of the above procedure can provide the associations between arbitrary levels of KPIs, while isolating only relevant KPIs to be analyzed. This can significantly reduce the data set size, and thus, lower the amount of time required to provide a reasonable set of outcomes. Also, this procedure can significantly simplify the process of interpreting results, as only relevant KPIs may be included.

In the case of a medium size KPI collection, it may be beneficial to combine group 1 and 2 KPIs Turning to FIG. 9B, simplified flow 950 shows possible operations that may be associated with at least one other embodiment for analyzing mobile network performance data using hierarchical association rule mining techniques. A set of operations corresponds to the activities of FIG. 9B. A network management system (e.g., 40) may comprise means, such as at least one processor (e.g., 49) for performing the operations. In at least one embodiment, at least some of the operations of flow 950 may be performed by an association rule mining module (e.g., 44). For ease of illustration, FIG. 9B will be described with reference to the hierarchical key performance indicator (KPI) structure 850 of FIG. 8B.

Initially, when performing an analysis of a mobile network using association rule mining techniques, an initial set of as many relevant group 1 KPIs and group 2 KPIs as possible can be included and association rule mining can be applied to the initial set of KPIs as previously described herein. In one example, the initial set of KPIs may include any or all of the KPIs of an access point (or multiple access points) of the mobile network. At 952, the network management system may receive a selection of a subset of group 1 KPIs and group 2 KPIs. In one example, the most relevant KPIs may be selected based on analysis of association rules resulting from association rule mining applied to the initial set of KPIs. This selection may be received from a user (e.g., a network operator) or may be preconfigured based on policies applied to the association rules.

At 954, a first set of items based on quantized values of the selected subset of group 1 and 2 KPIs may be determined. This first set of items may also be based on quantized values of a subset of group 3 KPIs that are child nodes of the selected subset of group 1 and 2 KPIs. This first set of items may be created, generated and/or identified from the set of items created for the initial set of relevant group 1 and 2 KPIs of the mobile network. It will be apparent that the first binary representation may be based on the quantized values of the KPIs in the selected subsets. At 956, association rule mining is re-performed using the first set of items. Accordingly, the possible causes of dominant service-specific failures can be isolated.

Performing the association rule mining in hierarchical order allows the operator to progressively "zoom-in" to the more detail KPIs in the attempt to find out the relationships between high-level KPIs and their underlying causes. In this way, many irrelevant KPIs can be filtered out.

Access points may be selected for association rule mining based on certain prioritizations, which may be configurable by a network operator (or other user). The above association rule mining is shown and described on a per-access-point (AP) basis. Thus, deciding which APs to select, and in which order to select them, may be important to obtain the desired information. A large number of access points may be present in a mobile network, and therefore, a ranked list of APs with decreasing order of urgency, may be desirable, so that certain APs can receive more prioritized attention.

In some scenarios KPIs that are considered important are drop calls for CS and PS. Therefore, these KPIs can be used as ranking criteria in identifying APs that require further investigations. However, these KPIs in isolation may not be sufficient. For example, if a certain KPI is averaged over a period of time, its behavior with respect to other KPIs may be averaged out. A closer look at its relationship with respect to another KPI, however, may reveal something unexpected. For example, in a well-behaved AP, the drop call rate should be relatively insensitive to the traffic load. If a load is high, an admission controller should be able to prevent too many bearers from being established, in order to avoid call drops due to the lack of resources. In other words, if high drop call happens persistently at a high load, it may indicate that the admission controller is not performing well. On the other hand, with a light traffic load, call drops should not normally happen, unless the user goes out of the coverage area. While it is possible that frequent drop calls happen due to bad user positions within the network, the effect of such a situation should be averaged out over large statistical samples. Thus, if persistent bad user position is the cause of the call drop, coverage planning could be the issue. Accordingly, it should be apparent that the average drop call rate in isolation may only provide a part of the picture in terms of mobile network performance.

Despite the expectation that the drop call should be relatively insensitive to the traffic load in well-behaved APs, it may not always be the case. For example, let X be the set of successful RAB counts, and Y be the set of drop call rate for PS associated with each of the elements within X. Let X be divided into N bins, and $X_i$, i=1, 2, ..., N corresponds to set of values which fall within bin i. Let $Y_i$ be the set of drop call rates in which each element of $Y_i$ corresponds to a unique element within $X_i$.

Figure 10A:
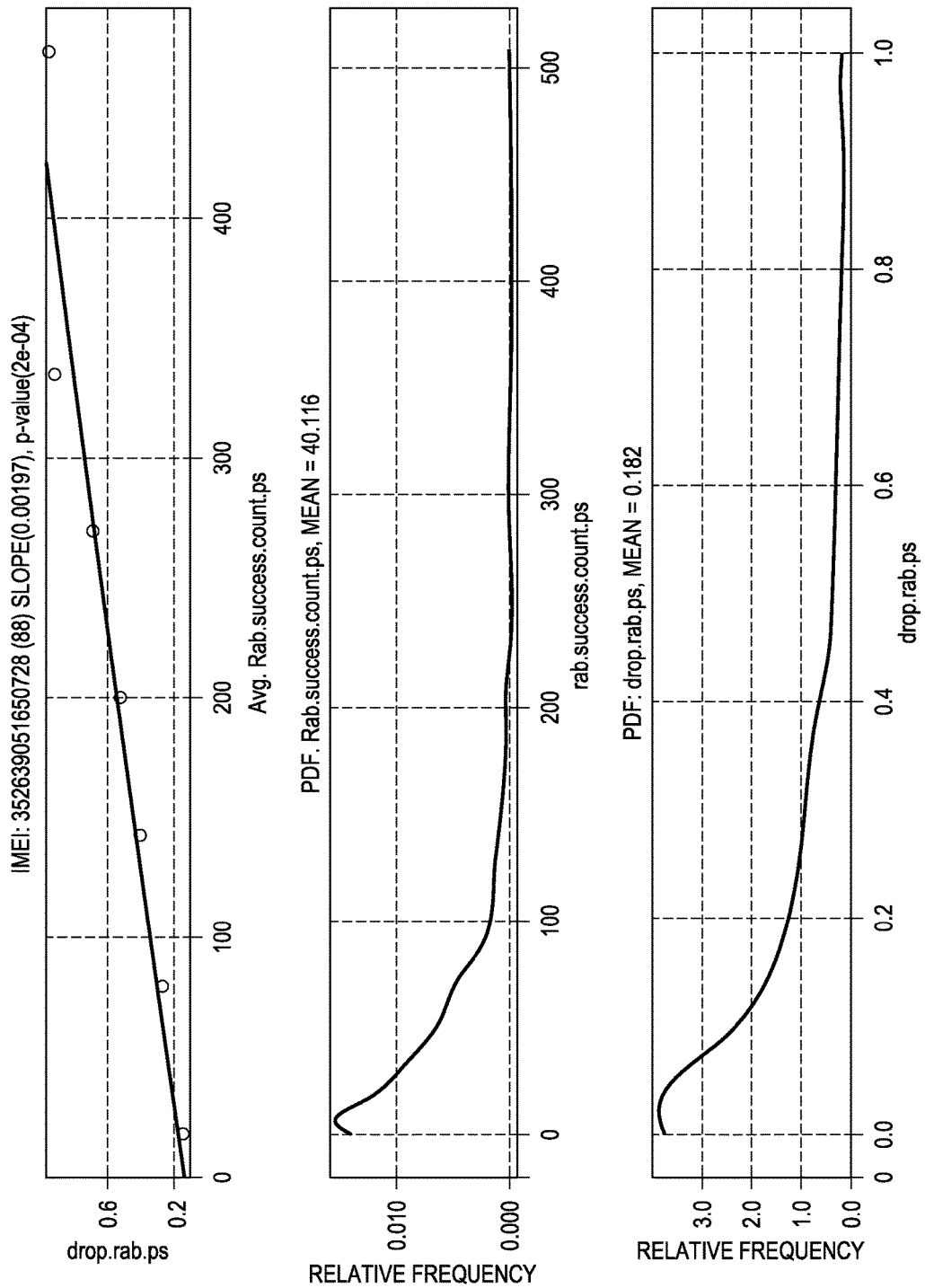
FIGS. 10(A) and 10(B) each show a series of graphs illustrating possible dropped call rates for packet switching for respective example access points, which could be created according to at least one embodiment.
Figure 10B:
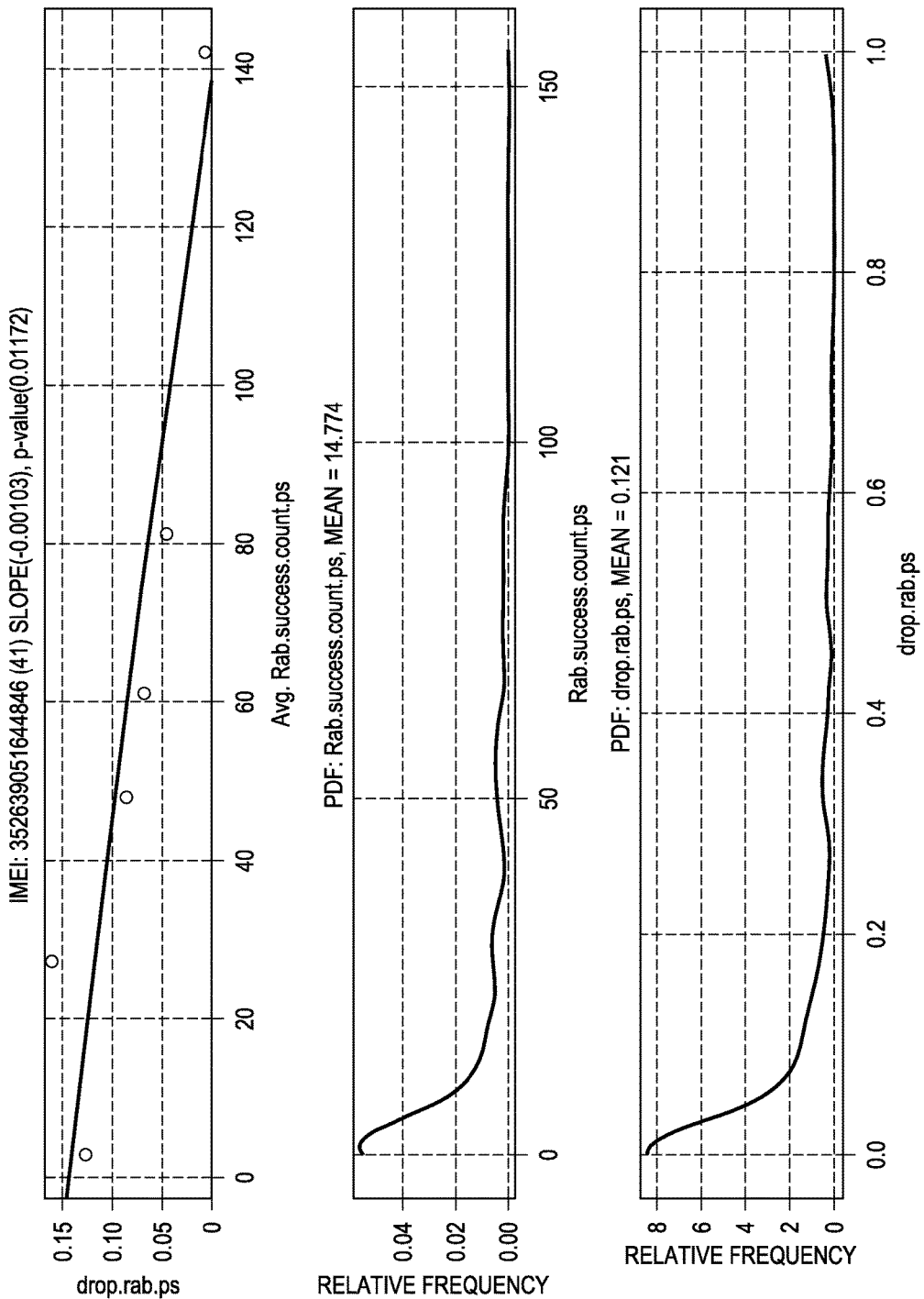

FIGS. 10A and 10B each include a series of graphs for respective APs showing the 1) the average drop call rate for PS, $\overline{Y}_i$, as a function of the average number of successful RAB counts, $\overline{X}_i$, 2) the density $f_X(X)$ of the RAB success counts X, and 3) the density $f_Y(Y)$ of the drop rate Y. In the top sub-figures, linear regression models for $\overline{X}_i, \overline{Y}_i$ are also included, i.e. $\overline{Y}_i = a\overline{X}_i + b$. It can be seen that the AP of FIG. 10A exhibits a positive relationship between $\overline{X}_i$ and $\overline{Y}_i$, while the AP of FIG. 10B exhibits the opposite. Based on the FIG. 10A, it may be tempting to associate a positive slope with a high drop rate and vice versa. It is clear, however, from FIG. 10B that this is not the case. Another hypothesis is that these values of slope are not statistically significant, and the observation is due to random chances. However, the p-values shown in the top sub-figures indicate that this is not the case. Thus, the magnitude and sign of the slope may potentially provide some insights on whether the call drop is due to sub-optimal traffic dimensioning or coverage planning. Accordingly, it may be beneficial to rank the APs not just based on the decreasing order of average drop rate, but also the decreasing/increasing order of a, or |a|.

Data Visualization Using Self-Organizing Maps, Clustering, and Categorization

For purposes of illustrating the process for analyzing mobile network performance using automated classification and labeling on a self-organizing map (SOM), it is important to understand data and analysis techniques related to mobile network performance. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, in a wireless network, a vast number of performance counters (e.g., 22) are generated and stored in a network monitoring database (e.g., 30). Due to the size of the data set and the large number of performance counters, analyzing the data to find patterns and associations among these counters is often difficult and may not even be feasible in some instances. Thus, diagnosing problems in a mobile network based on performance data from hundreds of performance counters can be problematic.

A technique called Self-Organizing Map (SOM) can be used to analyze wireless network performance data, which may include raw performance counters as well as Key Performance Indicators (KPIs) derived from these counters. SOM is a well-known data-mining method used to cluster and visualize high dimensional data by projecting it into a low-dimensional (typically 2D) lattice. This lattice consists of neurons (SOM units) that are trained iteratively to extract patterns from the input data. These patterns are abstractions of the input data and are referred to as code book vectors. At the start of the training phase, each neuron is assigned a code book vector that is updated at each iteration in such a way that topological properties in the input training data are preserved. SOM is unique in the sense that it combines two important aspects of data mining simultaneously: 1) data reduction by clustering, and 2) construction of a nonlinear projection of the data onto a low-dimensional display.

SOM organizes data on the basis of similarity by placing similar neurons (also referred to herein as 'nodes') geometrically close to each other. The property of topology preservation implies that the mapping process preserves the relative distance between the nodes. It can recognize input data that it has never encountered. This new input is then assimilated within the node to which it is mapped. Due to the topology preserving property of SOM, the mapping results inherently display the clusters in the data.

In general, a SOM-based data analysis comprises a number of operations including data preprocessing, SOM creation, cluster analysis, and classification labeling. Typical data preprocessing can include removing data that is not relevant to the analysis, removing data that is corrupted, and possibly removing outlier data. Another aspect of data pre-processing is scaling. In some scenarios, the nature of the variables to be studied can be of very different scales. For example, if variable A ranges between 0 and 1000, while variable B ranges between 0 and 1, variable B may be treated as noise, and may not be properly represented during the SOM processing. Thus, the data may be normalized before SOM processing.

A SOM algorithm may be applied to the pre-processed performance data to create a SOM. An iterative process may be used to train the SOM and generate a plurality of neurons (or nodes) that corresponds to a vector of feature weights (feature weight vector), where each feature corresponds to a key performance indicator (KPI) of the wireless network. The weight refers to the relative importance of the feature recognized within the map.

Typically, once a SOM is trained, a secondary clustering can be done in order to group the neurons together. One example way to determine the number of clusters is based on the Davies-Bouldin cluster validation index. Such clustering is similar to a secondary level of quantization, whereby neurons exhibiting a similar code book pattern are grouped together, or quantized to the closest classification label. Subsequently, the resulting set of clusters can then be used to classify data.

Once the clusters are formed, physical meaning can be attached to the clusters. Some automatic methods have been presented for post-processing of SOMs in the context of hierarchical data. Clusters are formed and interpreted automatically in order to reveal meaningful insights for domain experts. In some methods, the SOM is automatically labeled based on the features of the input data that are most relevant in assigning this set of input data to a particular cluster. In these approaches, however, the statistical distributions of the feature weightings are not exploited.

Using SOM, an operator can group a number of KPIs (or, equally, performance counters), and analyze them simultaneously, which may allow some patterns to emerge. Post-processing may be done in order to further cluster these patterns and each cluster can correspond to a non-overlapping set of neurons. However, even if clusters are formed, it is often difficult for the operator to interpret the results.

A system for analyzing mobile network performance using automated classification and labeling of a SOM, as outlined in network environment 100 of FIG. 1, can resolve these (and other) issues. The system provides an automated process of attributing meanings to clusters in order to enable meaningful analysis of massive amounts of mobile network performance data and to unveil hidden patterns within the data. Each neuron within a SOM corresponds to a vector of feature weights (feature weight vector), and each feature corresponds to a performance indicator of the wireless network. The weight refers to the relative importance of the features recognized within the map. The idea is to isolate a set of clusters in which the feature weights associated with this set of clusters follow certain pre-defined rules. If the number of neurons within a cluster that satisfies a pre-defined rule for a feature is high, this particular feature has dominance within this cluster. The above procedure is repeated for all features. The end result is that each cluster is labeled based on its dominant features. In addition, a "soft-mapping" between dominant features and clusters is also allowed. In this way, the chance for a feature in one cluster to be over-shadowed by the same feature in another cluster can be reduced. In this document, various generalizations of the pre-determined rules are proposed.

The system for analyzing mobile network performance using automated classification and labeling of a SOM offers numerous advantages. First, the system provides a unifying framework in the context of analyzing wireless network counters and key performance indicators (KPIs). The outcome of the system enables a network operator to interpret clusters of a SOM in a meaningful way. Also, the entire statistical distribution of each feature's weighting is taken into account in order to fully utilize the information that is available in the SOM. Also, this proposed framework allows performance target requirements of each of the features to be taken into account, and thereby providing a more general and flexible approach in automatically classifying and labeling clusters within a SOM.

Figure 11A:
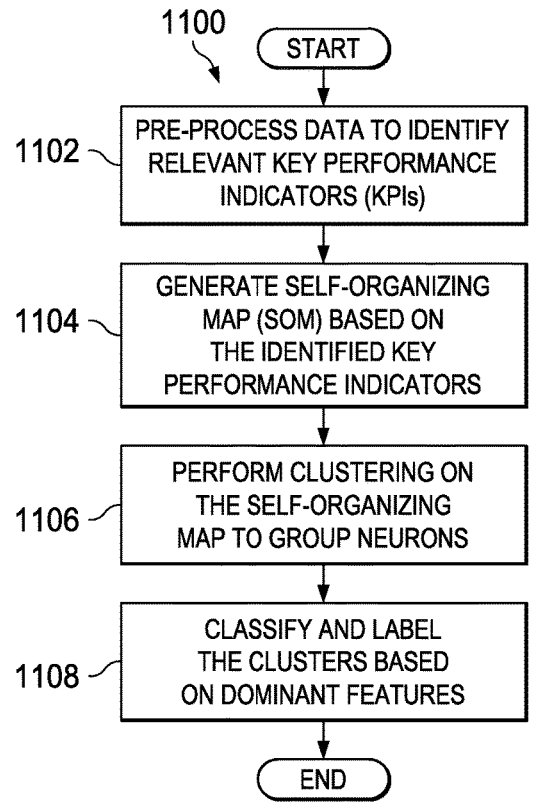
FIG. 11A is a simplified flowchart illustrating possible operations related to generating a self-organizing map based on performance data of a mobile network according to at least one embodiment of the present disclosure.

Turning to FIG. 11A, FIG. 11A is a simplified flowchart of a possible flow 1100 of operations of at least one embodiment associated with generating and using a self-organizing map to analyze mobile network performance as described herein. A set of operations corresponds to the activities of FIG. 11A. A network management system (e.g., 40) may comprise means, such as at least one processor (e.g., 49) for performing the operations. In at least one embodiment, at least some of the operations of flow 1100 may be performed by SOM data analysis module (e.g., 46).

At 1102, pre-processing may be performed on performance data from mobile network 20 to identify key performance indicators (KPIs). Standard types of pre-processing may be performed, as previously described herein (e.g., removing irrelevant data, removing corrupted data, removing outlier data, normalizing data). In addition, in accordance with at least some embodiments herein, pre-processing to rank KPIs may also be performed. If the pool of KPIs to be analyzed is very large, it may be desirable to have a systematic way to restrict the set of KPIs to be included in the data analysis. One useful way to measure the relevance of a KPI is to observe the level of its variability over the entire duration of data collection. If the variability is very small, then this may indicate that the KPI would not play an important role in the structure of the pattern in the SOM map to be created. To identify whether a KPI would play an important role in the map pattern, a variance of the KPI can be calculated and a determination may be made as to whether the result is below a certain pre-determined threshold. If the variance is below the threshold, the KPI may be excluded from the pool. If the variance is not below the threshold, the KPI may be included in the pool. In calculating the variance, it may be useful to remove data during the non-activity period of the network in order to reduce bias.

At 1104, a SOM algorithm may be applied to the performance data, based on the identified pool of KPIs, to generate a SOM. A map of nodes (also referred to herein as 'neurons') may be created, with each node corresponding to a vector of feature weights, where each feature corresponds to one of the KPIs of the identified pool being analyzed. The weight corresponds to the relative importance of the features recognized within the map. In addition, SOM organizes data on the basis of similarity by placing similar nodes geometrically close to each other.

At 1106, a clustering algorithm may be applied to the nodes of the SOM. This clustering is essentially a secondary level of quantization, in which nodes that exhibit a similar code book pattern are grouped together, or quantized to the closest classification label. In accordance with embodiments disclosed herein, at 1108, the resulting set of clusters can be used to classify and label the clusters based on dominant features within the clusters. Details of the classification processing are described in more detail below, particularly with reference to FIG. 11B.

Figure 11B:
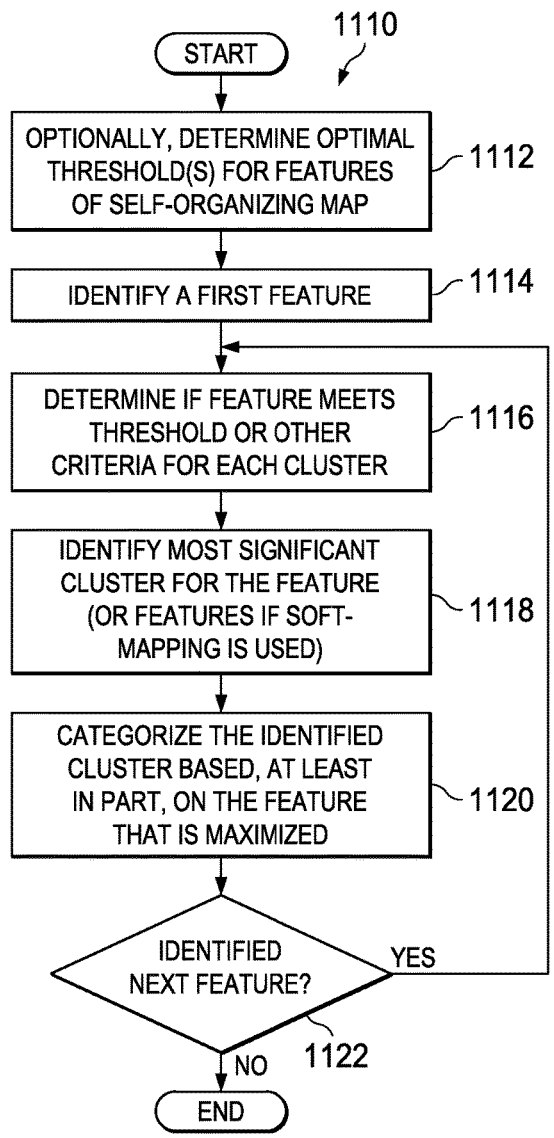
FIG. 11B is a simplified flowchart illustrating possible operations related to classifying clusters of a self-organizing map according to at least one embodiment of the present disclosure.

Turning to FIG. 11B, FIG. 11B is a simplified flowchart of a possible flow 1110 of operations of at least one embodiment associated with classifying and labeling clusters of a self-organizing map to analyze mobile network performance as described herein. A set of operations corresponds to the activities of FIG. 11B. A network management system (e.g., 40) may comprise means, such as at least one processor (e.g., 49) for performing the operations. In at least one embodiment, at least some of the operations of flow 1110 may be performed by SOM data analysis module (e.g., 46).

At 1112, one or more optimal thresholds may, optionally, be computed for features included in the SOM. Generally, a threshold is used in classification processing to help determine whether a feature (e.g., KPI, raw performance counter, etc.) is sufficiently significant within a cluster to possibly categorize the cluster based, at least in part, on the feature. If a threshold is set too high, then a feature may not be identified as significant in any cluster, even if the feature is detected with regularity in the mobile network. However, if a threshold is set too low, then a feature may be identified as significant in so many clusters that its meaning is diminished. Therefore, in at least some embodiments, an optimal threshold may be computed in order to ensure that at least some features are determined to be significant within a cluster, without too much inclusivity.

Accordingly, identifying a percentile threshold $p_j$ may be configured such that the interpretation of the cluster is as representative as possible. For simplicity, let $p_1 = p_2 = \ldots = p_j = p$. Let $R_j(c_j^*(p))$ be the ratio corresponding to the most significant cluster $c_j^*(p)$ associated to a given percentile $p$, and let $\tilde{P}$ be the set of percentile values. The most significant cluster is the cluster that maximizes a metric for a particular feature, which will be further described herein. Thus, the objective is to find the percentile value $p^*$ such that:

$$p^* = \underset{p}{\operatorname{argmax}}\left(\sum_{j=1}^{J} v_j R_j(c_j^*(p)), \forall\, p \in \tilde{P}\right) \quad (4)$$

Subsequently, the selected cluster for feature j would be $c_j^*(p^*)$. Note that the weightings $v_j$ are included in order to provide the flexibility to emphasize a certain set of features within the summation. The reason is that if the sum is computed with all features being treated equally, some less important features may potentially obscure other more interesting features. By introducing the feature-specific weighting, the result of the summation can be more representative to more interesting features.

At 1114, a first feature of a feature vector of the SOM may be identified. At 1116, a determination is made as to whether the feature meets a threshold (or other defined criteria) in one or more nodes of each cluster. In at least one embodiment, a ratio, or metric, for a cluster can be determined based on the count of nodes in that cluster that meet the threshold (or other defined criteria) relative to the count of nodes across all clusters that meet the threshold (or other defined criteria). Thus, the feature can be counted in each cluster when the feature meets the threshold (or other defined criteria) and a ratio can be determined for that cluster based on counts of the feature in the cluster relative to counts of the feature across all other clusters.

To illustrate the calculations, let $\overline{w}_i = (w_{i,1}, w_{i,2}, \ldots, w_{i,j})$ be a feature vector in the code book for SOM node i, where $w_{i,j}$ corresponds to the weight for node i and feature j. Due to the pseudo-random nature of the weights $w_{i,j}$ during the process of weight adaptation, the element $w_{i,j}$ can be approximated as a random variable from the output of the SOM for a given feature j (i.e., $W_{i,j}$). Also, let $p_j = P(W_{i,j} \leq \eta_j)$ be the cumulative distribution function (CDF) of $W_{i,j}$. Thus, by defining a fixed percentile $p_j$, it is possible to obtain an upper limit $\eta_j$ for $W_{i,j}$ which lies below this percentile. It should be noted that an optimal percentile threshold may optionally be determined as previously described herein with reference to 1112.

Subsequently, a set of node identities $I_j$ can be defined such that $W_{i,j} \leq \eta_j$ (i.e., $I_j = \{i | W_{i,j} \leq \eta_j, \forall i\}$). In other words, $I_j$ corresponds to the set of nodes such that the corresponding weight $w_{i,j}$ is less than or equal to the threshold $\eta_j$ for a given j. As there is a one-to-one mapping between the set of nodes $I_j$ to the set of clusters C (i.e., $f: I_j \to C$), the number of counts $m_{c,j}$ of nodes that fall within cluster c for each feature j can be obtained. Let $R_j$ be the number of counts for cluster c relative to the counts of other clusters for a given feature j, where $\in$ is a small number used to avoid a zero denominator:

$$R_j(c) = \frac{m_{c,j}}{\sum_{k \neq c} m_{k,j} + \epsilon} \quad (1)$$

Note that $\in$ can also be set to $m_{c,j}$. In this case, the denominator would be the sum of the counts across the entire map for feature j.

In at least one embodiment, a normalization factor may be introduced when computing $R_j(c)$. Accordingly, the metric $R_j(c)$ can alternatively be modified to the following, where $m_c$ is the count of the number of nodes that falls within cluster c:

$$R_j(c) = \frac{1}{m_c} \left( \frac{m_{c,j}}{\sum_{k \neq c} m_{k,j} + \epsilon} \right) \quad (2)$$

The use of $m_c$ in formula (2) above is to normalize the ratio $R_j$ in order to take into account the effect of the size of the cluster. For example, it is possible to have a low number of counts for cluster $c_1$ compared to cluster $c_2$. However, if the number of nodes for $c_1$ is low (i.e., the majority of the nodes within $c_1$ are counted), then $c_1$ could still be considered an important cluster for feature j if normalization is used. However, if the absolute number of counts is to be emphasized, then normalization should not be used and formula (1) should be used to compute $R_j(c)$.

At 1118, the most significant cluster may be identified for the feature. In at least one embodiment, the most significant cluster can be the cluster corresponding to the worse performance associated with feature j. The cluster that maximizes the metric $R_j(c)$ for a feature j may be the most significant cluster, and can be defined as:

$$c_j^* = \mathrm{argmax}_c(R_j(c), \forall c) \quad (3)$$

At 1120, the identified most significant cluster may be categorized based, at least in part, on the feature that is maximized in the cluster. Thus, $c_j^*$ can be categorized based on feature j. In some cases, multiple features may be maximized in a single cluster and therefore, the cluster may be categorized based on the multiple features. It should also be noted that in some implementations, multiple significant clusters may be identified based on the same feature. In this scenario, at 1120, the multiple significant clusters may be categorized based, at least in part, on the same feature. This 'soft-mapping' is described in more detail below. As a result of processing described with reference to 1120, each cluster is labeled based on the dominant features it possesses.

At 1122, a determination may be made as to whether a next feature is identified in the feature vector of the SOM. If a next feature is identified, then the flow can repeat 1116-1120, where the identified next feature is analyzed for each cluster and the clusters are categorized accordingly. This processing may be repeated until all of the features in the feature vector have been analyzed and the clusters have been categorized. When it is determined at 1122 that no more features have been identified, then processing may end.

In at least some embodiments, 'soft mapping' may be used such that multiple clusters can be categorized based on the feature if appropriate. According to formula (3), a cluster that corresponds to the highest metric $R_j(c)$ can be selected for each feature j. Such a definition for the dominant cluster is restricted because 1) it is possible to have multiple clusters sharing the same value of the metric and 2) by nature, the definition of a dominant cluster is fluid.

For example, it may be possible to define the most significant cluster as the one that includes the most number of nodes that satisfies a certain set of criteria for each feature. In the above case, the criterion would be $I_j = \{i | W_{i,j} \leq \eta_j, \forall i\}$. If such a cluster, e.g., $c_1$, includes a large number of nodes, e.g., $N_1 = \{n_1, n_2, \ldots, n_{10}\}$, and if even half of them, e.g., $N_2 = \{n_1, n_2, \ldots, n_5\}$, satisfy the criterion (the qualifying nodes), the total number of such nodes still could exceed those of other clusters. In this case, such a cluster can be defined as the dominant cluster for feature j. This scenario is captured in formula 3.

However, it is possible that a much smaller cluster exists. For example, a cluster $c_2$ with a much smaller set of nodes, e.g., $\{n_{21}, n_{22}\}$, than cluster $c_1$ may be present in the SOM, and these nodes may also satisfy the selection criterion such that $W_{i',j} \leq W_{i,j} \leq \eta_j, \forall i' \in N_2, \forall i \in N_1$. In this case, it may be beneficial to boost the weighting of cluster $c_2$ as in formula 4 by normalizing the metric by the number of nodes associated with each cluster. However, by normalization, it is possible for cluster $c_2$ to become the dominant cluster, and thereby discount the importance of the weighting associated with nodes in cluster $c_1$.

In order to overcome the above dilemma, one approach is to relax the number of dominant clusters for feature j to more than one cluster by modifying formula 3 as follows:

$$\tilde{C}_J = \langle c \mid R_j(c) \geq \xi_j R_j(c_j^*), \forall c \rangle \quad (5)$$

According to formula 5, any clusters with an associated metric larger than or equal to a fraction of the largest metric can be included. This provides a soft selection strategy (or 'soft mapping') such that the adverse effect of quantization due to the normalization can be reduced or controlled. In other words, this soft selection provides a trade-off between the effects of normalized formula 2 and un-normalized formula 1 metric respectively.

In a further variation of the computations described with reference to flow 1110 of FIG. 11B, alternative selection criteria may be used in at least some embodiments. As shown by formulas (1)-(4), the counting criterion assumes the weight of a node for feature j to be below a certain percentile $p_j$. In other words, the node is counted if and only if it falls within a pre-defined tail of the distribution. The examination of lower tail statistics is useful if the objective is to isolate features that fall below a certain acceptable performance threshold. For example, if a performance counter or a key performance indicator (KPI) describes a positive outcome of a certain performance measure, the lower end of the distribution provides an insight to the probability that such a measure is below a certain acceptable level. On the other hand, if the objective is to determine the probability that such a performance measure is above a certain threshold, the upper tail of the distribution would be more useful. The same argument applies if a measure describing a negative outcome is involved. For example, if the objective is to determine the probability that the call drop rate is above a threshold, the upper tail of the distribution would be more appropriate. Thus, the nature of the feature and the conclusion that is made about such a feature can dictate which portion of the distribution should be used as the counting criterion.

In the light of the above, the selection criterion can be generalized to classify nodes into an arbitrary portion of the distribution. For example, if a set of nodes $I_j^{(1)}$ for feature j (e.g., the drop call rate) is above percentile $p_1$, then $I_j^{(1)}$ is considered to represent unacceptable drop call performance. Any access point (AP) that falls into such a category could be immediately addressed. However, it may be useful to find out a set of "secondary-tier" nodes $I_j^{(2)}$ that do not exhibit an unacceptable performance such as those in $I_j^{(1)}$, but are nevertheless "bad enough" that their respective drop rates are still above a second percentile $p_2 < p_1$. In this case, if an AP falls within such a category, the operator could still be alerted but the urgency to react could be much lower than for those that fall within the first category. The above generalization motivates the selection rule to be modified as follows, where k corresponds to the k-th category, and $\eta_j^{(0)} < \eta_j^{(1)} < \ldots < \eta_j^{(k)} < \ldots < \eta_j^{(K)}$:

$$I_j^{(k)} \in \{i \mid \eta_j^{(k-1)} \leq W_{i,j} < \eta_j^{(k)}, \forall i\}, k=1,2,\ldots,K \quad (6)$$

The relationship between $\eta_j^{(k)}$ and $p_k$ can be obtained based on the weight cumulative distribution for feature j. For example, the set of nodes that are associated with weights for feature j above the 90$^{th}$ percentile would be $I_j^{(k)} \in \{i \mid \eta_j^{(K-1)} \leq W_{i,j} < \eta_j^{(K)} = \infty, \forall i\}$, where $\eta_j^{(K-1)}$ is the threshold corresponding to the 90$^{th}$ percentile of the overall weights for feature j. With the above framework, it is possible to label each cluster using the following tuple, where c corresponds to the cluster index, and J is the maximum number of features:

$$Q_c = (Q_{c,1}, Q_{c,2}, \ldots Q_{c,j}, \ldots, Q_{c,J}), \forall c \quad (7)$$

Each element $Q_{c,j}$ of the tuple takes on a value chosen from one of the K categories (i.e., $Q_{c,j} \in \{1, 2, \ldots, K\}$).

It is important to note that formula 6 may be based on the relative performance associated with other nodes. In some situations, it may be useful to modify the criterion such that the weights are compared relative to the target requirement of the feature directly, where $\tilde{W}_j$, is the target requirement associated with feature j, and quantity $r_j^{(k)}$ corresponds to a fixed threshold level for segment k and feature j:

$$I_j^{(k)} \in \left\{ i \mid r_j^{(k-1)} \leq \frac{W_{i,j}}{\tilde{W}_j} < r_j^{(k)}, \forall i \right\}, \quad (8)$$
$$k = 1, 2, \ldots K$$

For example, the inequality $$I_j \in \left\{ i \mid 0.90 \leq \frac{W_{i,j}}{\tilde{W}_j} < 1.0, \forall i \right\}$$

corresponds to the set of nodes with weights for feature j that lie between 90 to 100 percent of the target requirement.

An illustrative example is now presented. Example data for a mobile network over a 4-month period, or reporting interval, is provided for the illustration. In this example, only performance counters that are relevant for obtaining some representative blocked calls and dropped calls are used as Key Performance Indicator (KPIs). In the context of SOM, each feature corresponds to a KPI. The input parameters and feature vector decomposition are given below in Table 1 and Table 2, respectively.

TABLE 1

Input Parameters

| Parameter | Value |
| --- | --- |
| SOM dimension | 10 × 12 |
| Normalized threshold $\xi_j, \forall j$ | 0.7 |
| Normalized metric | Yes, i.e., based on (2) |
| Percentile threshold | 90%, i.e., automatic selection is not enabled |
| CDF region of interest | Above percentile threshold |
| SOM Lattice shape | Hexagonal |
| Training algorithm | Batch |
| Neighborhood kernel | Gaussian |
| a(t) | Inv [1] |
| Clustering algorithm | K-means clustering |

TABLE 2

Feature Vector Decomposition

| Feature vector components j | Component definition |
| --- | --- |
| 1 | Radio Resource Control (RRC) connection block rate |
| 2 | Circuit Switch (CS) Radio Access Bearer (RAB) block rate |
| 3 | Packet Switch (PS) RAB block rate |
| 4 | Signaling Radio Bearer (SRB) drop rate |

TABLE 2-continued

Feature Vector Decomposition

| Feature vector components j | Component definition |
|---|---|
| 5 | CS RAB drop rate |
| 6 | PS RAB drop rate |

Figure 12:
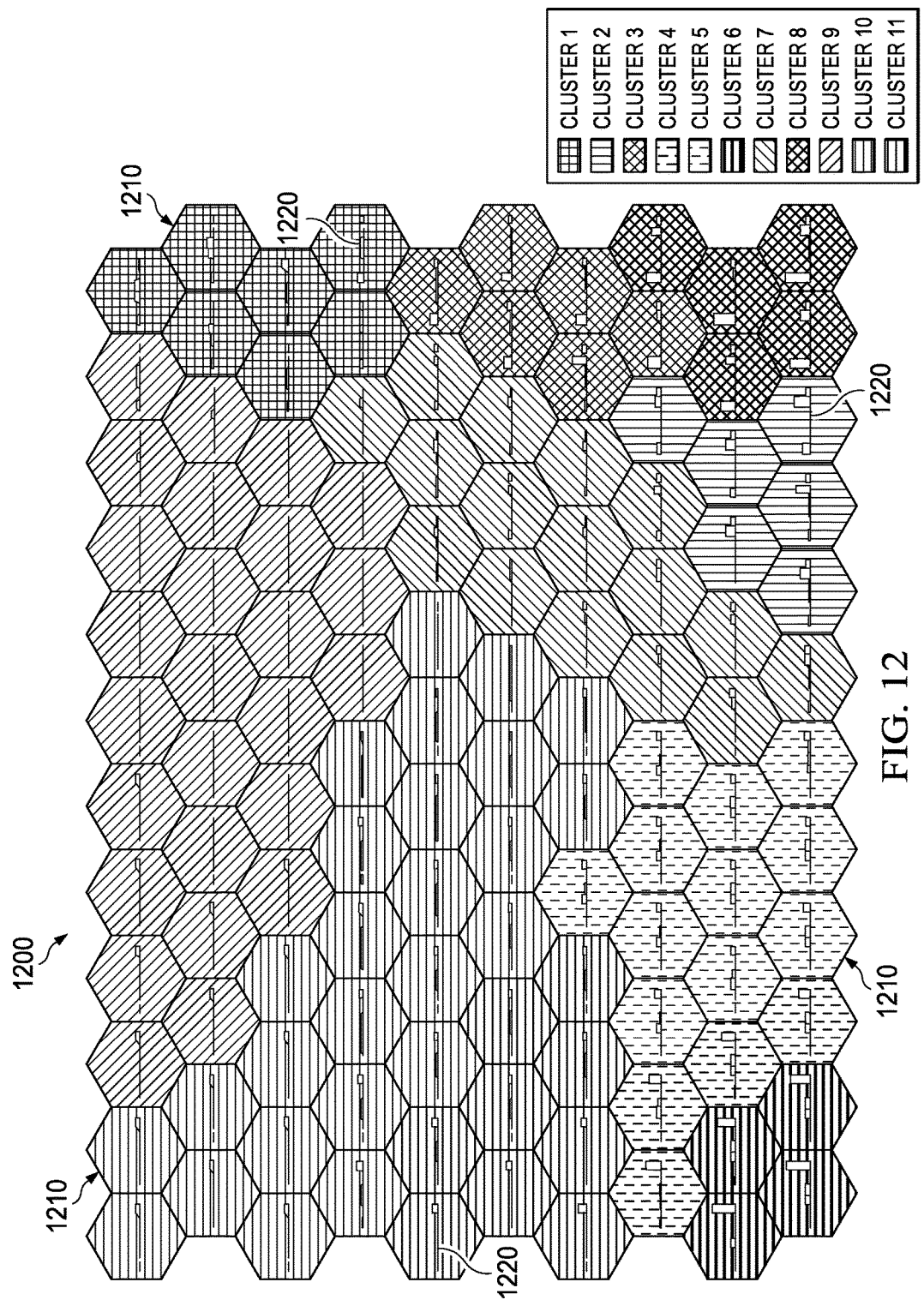
FIG. 12 is an example self-organizing map generated based on possible performance data of an example mobile network according to at least one embodiment.

FIG. 12 shows a computed self-organizing map (SOM) 1200, based on the example data, input parameters, and feature vector components defined above. Each node 1210 within the map represents a SOM unit (neuron), where a bar chart 1220 is shown to represent the weights of a code book vector associated with this neuron. Features 1 to 6 are shown from the left to right within each bar chart 1220. As can be seen in FIG. 12, each cluster 1-10 is represented by separate shading pattern, and nodes 1210 within each cluster share a similar feature pattern. Due to the topology preserving property of SOM, the feature vectors of adjacent nodes are more similar than those which are far apart. SOM 1200 produces a continuity of similar nodes across the map.

Figure 13:
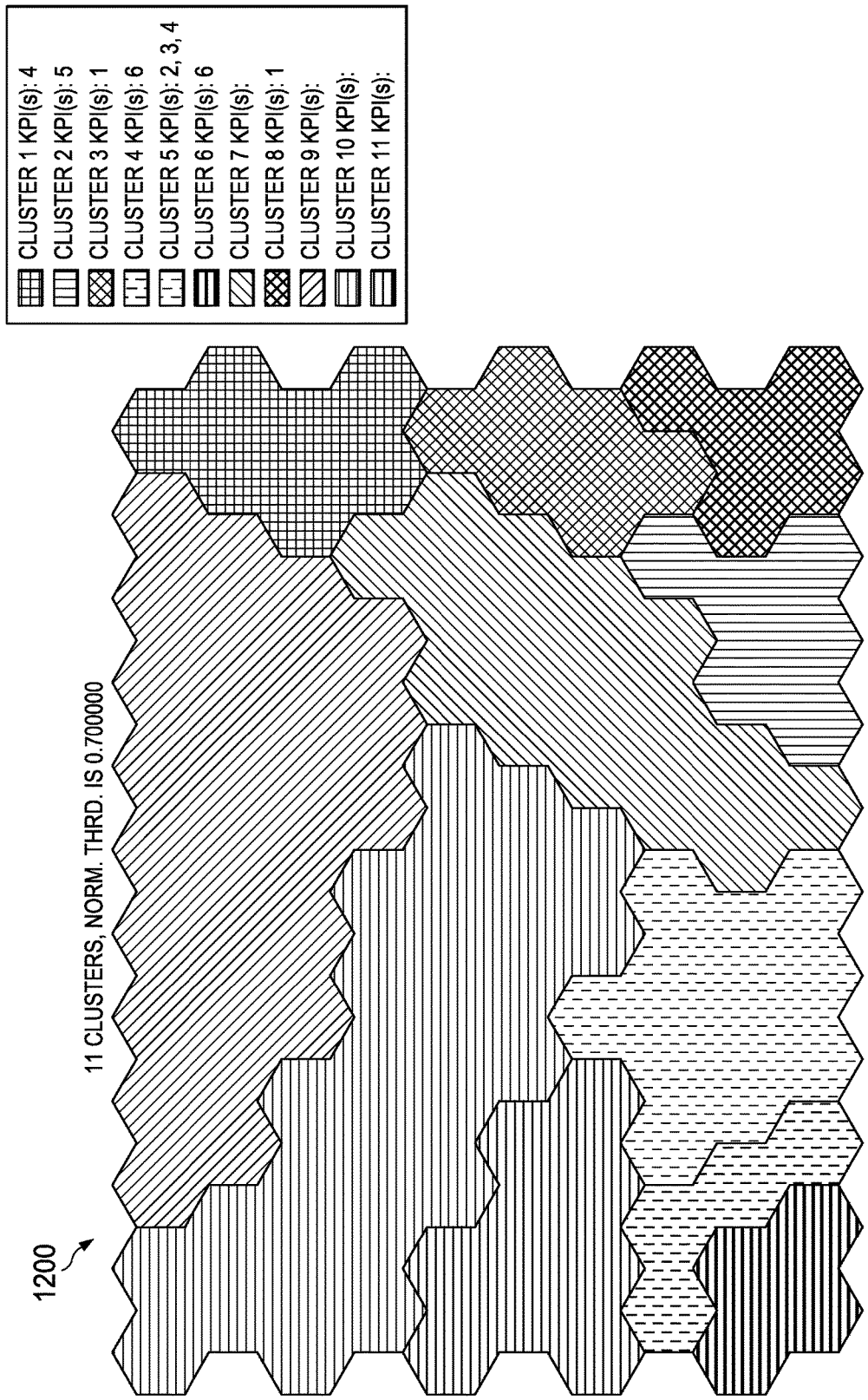
FIG. 13 is another representation of the example self-organizing map with possible cluster definitions according to at least one embodiment.

FIG. 13 is another representation of SOM 1200, showing how clusters 1-11 overlay the SOM. Each cluster is labeled with an identity and the most prominent feature or features associated with each cluster can also be labeled. In this example, each feature is associated with a KPI, and the meaning of each KPI is described in FIG. 13. For example, the dominant KPI for cluster 8 is KPI 1, which corresponds to the RRC connection block rate. In other words, cluster 8 is characterized by the high block rate of RRC connections. In another example, cluster 6 is characterized specifically by a high drop rate of Packet Switch (PS)-related Radio Access Bearer (RAB). Also, it can be seen that the dominance of feature 4 (i.e., SRB drop rate) can be found in both clusters 5 and 1. However, for cluster 5, features 2 and 3 are also dominant, and feature 6 is more visible compared to cluster 1. Thus, even though a KPI can be dominant in two different clusters, each of these two clusters can have very different KPI patterns (or signatures) if other KPIs are taken into account. The same idea can be generalized to all clusters.

While each KPI can be considered individually, SOM 1200 allows patterns of KPIs to emerge, which can be classified into clusters. Thus, a cluster represents a set of possible KPI patterns which share a similar characteristic. For example, cluster 9 corresponds to a KPI pattern where all block and drop rates are very low, and is considered to be the ideal performance baseline. Cluster 8, and, to a lesser extent, cluster 3 are dominated by a signature of high RRC block rate and relatively good performance for other KPIs. Clusters 6 and 4 are characterized by a high PS RAB drop rate with a small chance of PS RAB blocking and SRB dropping.

Figure 14:
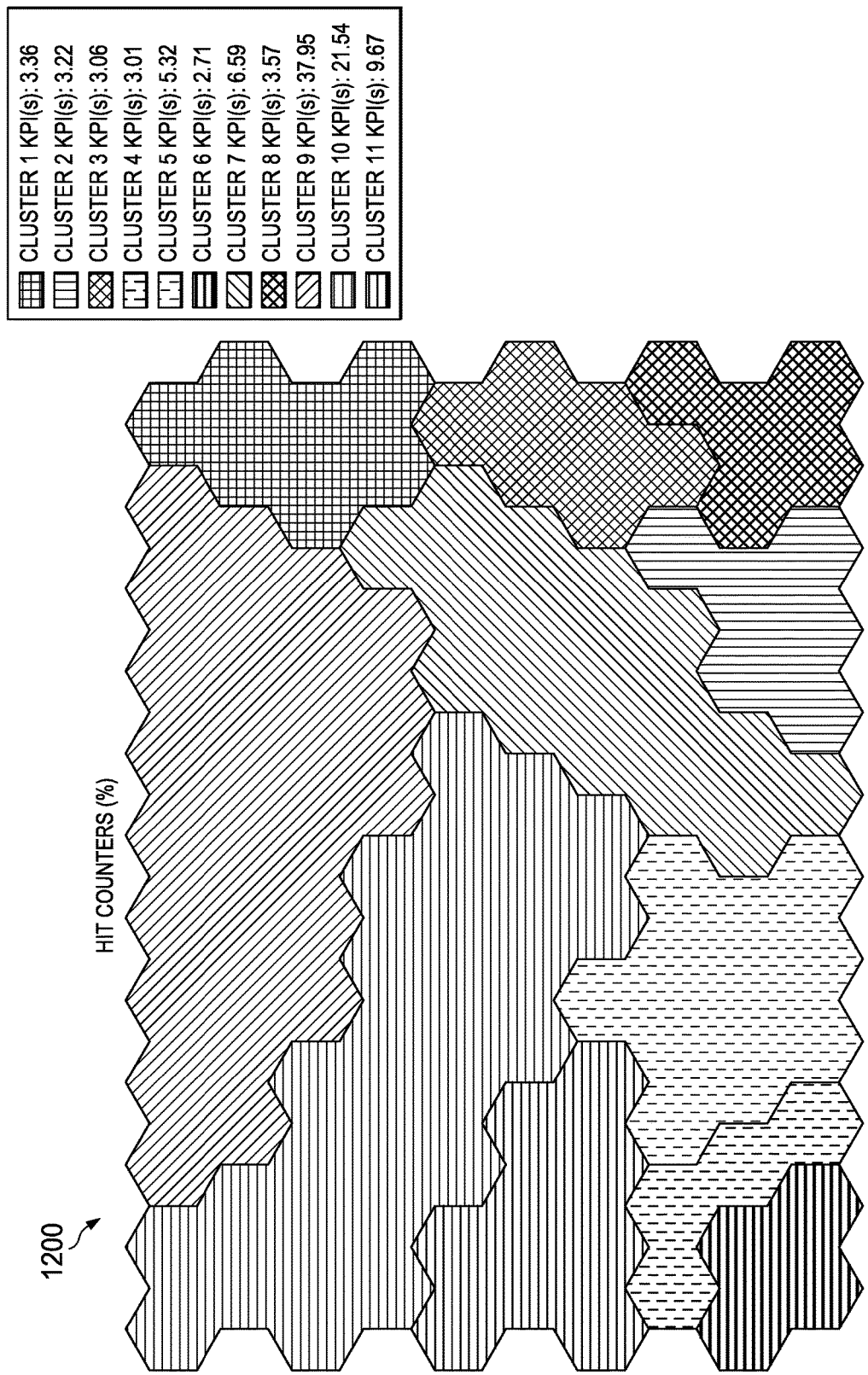
FIG. 14 is another representation of the example self-organizing map showing the probability of each key performance indicator (KPI) pattern within the map according to at least one embodiment.

FIG. 14 is another representation of SOM 1200, showing the probability of each KPI pattern within the map. It can be seen that for most cases, both block and drop rates are negligible as shown in the regions towards the upper part of the map (i.e., clusters 7 and 9-11). As shown in cluster 2, there is approximately a 3% probability that the CS dropping becomes dominant. However, by considering clusters 4 and 6, the chance of dominant PS dropping is about 5.7%. More importantly, such observation leads to the conclusion that the CS and PS dropping do not co-dominate. In other words, a high CS dropping does not necessitate a high PS dropping and vice versa. This observation suggests that there are separate dropping algorithms for both CS and PS RABs. Because PS RABs are typically considered to be of lower priority bearers, PS RABs are expected to be dropped before CS RABs as a result of congestion control. However, based on the clusters, there can also be a high CS dropping while the PS drop rate remains low. In this case, the CS dropping may be due to reasons other than congestion.

Figure 15:
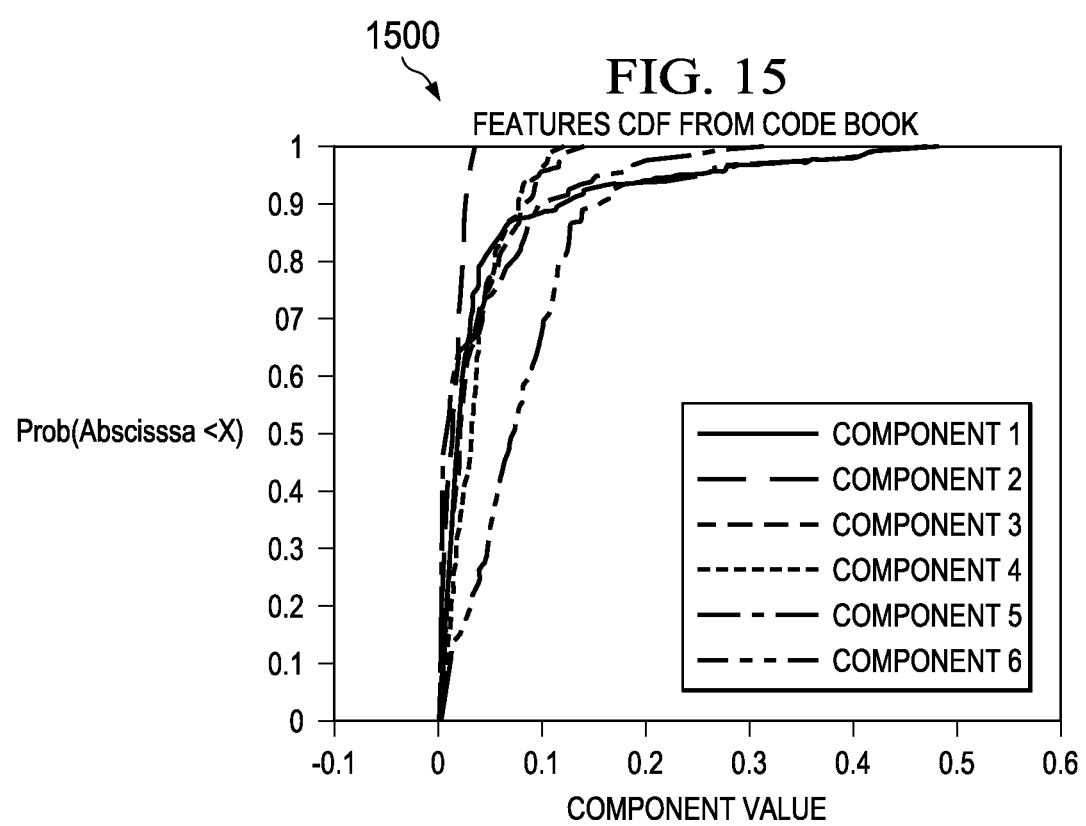
FIG. 15 is an example graph illustrating a cumulative distribution function for code book features based on the example self-organizing map, which could be created according to an embodiment of the present disclosure.

FIG. 15 is a graph showing a cumulative distribution function (CDF) of each feature component in the code book. One implicit function of SOM is to patterns features to be seen. It can be seen that some features tend to have a much larger variability than others. For example, features 1 and 6, which correspond to RRC blocking rate and PS dropping rate, have a significantly larger variability than features 2, 3, and 4. In particular, as shown in both FIG. 12, and, more explicitly, FIG. 15, the variability of feature 2 is very low. This observation suggests that CS block rate does not contribute much insight into the interpretation of data as compared to other features. Thus, by simply classifying the variability of components of the feature vector in the code book, a significant insight can be achieved in deciding the usefulness of the feature for the sole purpose of data analysis. Even though the RRC block rate and the PS drop rate both have a large variability due to the nature of their heavy upper tails, their respective medians are significantly different. The median is much larger for the PS drop rate (>7%) than for the RRC block rate (~1.7%). This observation shows that the PS drop rate is significantly more pervasive than the other KPIs shown. Thus, special attentions to the PS drop rate may be needed.

Figure 16:
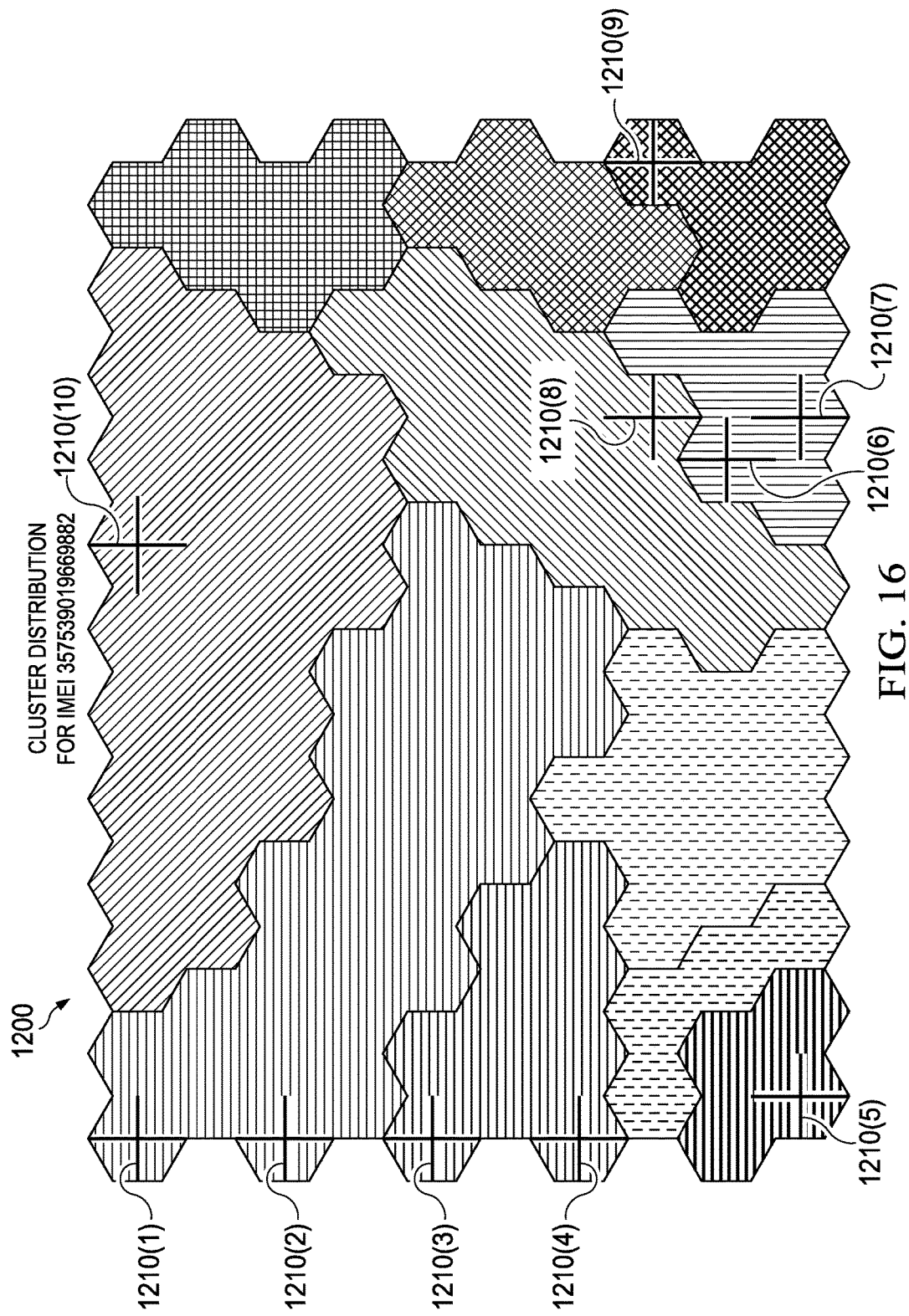
FIG. 16 is another representation of the example self-organizing map showing a possible distribution of nodes across the example self-organizing map for a selected access point (AP) according to at least one embodiment.

It is important to note that the above inference applies to the data set over a period of time. An extension to the above analysis is to look at the dynamic behavior of the clusters. FIG. 16 is another representation of SOM 1200 that shows how the clusters are distributed across the map for a single access point (AP) over a selected period of time. It is apparent that the performance of the AP has been changing as the closest node that matches its feature vector jumps across different clusters within the map. Representations of AP 1210(1)-1210(10) indicate the AP at ten different times over the selected period of time.

FIG. 17 is a graph showing the clusters which best match the performance of the example AP over the selected period of time. FIG. 17 shows that the AP's performance started out with negligible block and drop rates, and proceeded through cluster 11 with noticeable PS drop calls to cluster 6 with serious PS drop calls. Very shortly after that, the PS drop call rate diminished significantly while it was replaced by a high RRC block rate as shown in cluster 8. Subsequently, both drop and block rates became insignificant as the AP performance moved to cluster 7, before reaching cluster 2 where the CS drop rate becomes high. In this example scenario, it is worth noting that the CS drop rate exceeded the PS drop rate even though CS is considered to be a higher priority service in general.

VARIATIONS AND IMPLEMENTATIONS

In at least some example implementations, network management system 40 includes software to achieve (or to foster) the mobile network performance analyses (e.g., related to association rule mining and/or to classification of clusters in a self-organizing map) as outlined herein. Note that in one example, network management system 40 can have an internal structure (e.g., a processor, a memory element, etc.) to facilitate some of the operations described herein. In other embodiments, the analyses may be executed externally to system 40, or included in some other network element to achieve this intended functionality. Alternatively, system 40 may include this software (or reciprocating software) that can coordinate with other network elements in order to achieve the operations, as outlined herein. In still other embodiments, one or several devices may include any suitable algorithms, hardware, firmware, software, components, modules, interfaces, or objects that facilitate the operations thereof.

Network management system 40 and mobile network 20 include network elements that facilitate the analysis of mobile network performance data in a given network (e.g., as illustrated in FIG. 1). As used herein, the term 'network element' is meant to encompass servers, routers, switches, gateways, bridges, loadbalancers, firewalls, inline service nodes, proxies, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

Note that in certain example implementations, the mobile network performance analyses functions outlined herein may be implemented by logic encoded in one or more machine readable storage media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. Additionally, the components of the system for analyzing mobile network performance may include a processor (as shown in FIG. 1) that can execute software or an algorithm to perform activities as discussed herein. A processor can execute any type of instructions associated with the data to achieve the operations detailed herein. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described herein should be construed as being encompassed within the broad term 'processor.' Each of the components can also include suitable interfaces for receiving, transmitting, and/or otherwise communicating data or information in a network environment.

In one example implementation, components of the system for analyzing mobile network performance may include software modules (shown in FIG. 1) in order to achieve, or to foster, the functions outlined herein. These modules can be suitably combined or partitioned in any appropriate manner, which may be based on particular configuration and/or provisioning needs. The components of the (e.g., network management system 40) can include volatile and/or nonvolatile memory elements for storing data and information, including instructions and/or logic, to be used in achieving the analysis of mobile network performance data, as discussed herein. These components may further keep data and information in any suitable memory element (e.g., random access memory (RAM), read-only memory (ROM), programmable ROM (PROM), EPROM, EEPROM, a disk drive, a floppy disk, a compact disk ROM (CD-ROM), a digital versatile disk (DVD), flash memory, a magneto-optical disk, an application specific integrated circuit (ASIC), or other types of nonvolatile machine-readable storage media that are capable of storing data and information), software, hardware, firmware, or in any other suitable component, device, element, or object where appropriate and based on particular needs. Any of the memory items discussed herein (e.g., memory elements 27, 47, etc.) should be construed as being encompassed within the broad term 'memory element.' Moreover, the information being used, tracked, provided, communicated, presented, sent, or received in the system could be provided in any repository, database, register, queue, table, cache, or other storage structure, all of which can be referenced at any suitable timeframe. Any such storage options may also be included within the broad term 'memory element' as used herein.

Note that with the examples provided herein, interaction may be described in terms of two, three, four, or more network components. However, this has been done for purposes of clarity and example only. It should be appreciated that the system can be consolidated or divided in any suitable manner. Along similar design alternatives, any of the illustrated computers, modules, components, and elements of FIG. 1 may be combined in various possible configurations, all of which are clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) is readily scalable. The system can accommodate a large number of components, as well as more complicated or sophisticated arrangements and configurations. Accordingly, the examples provided should not limit the scope or inhibit the broad teachings of the system as potentially applied to a myriad of other architectures.

For ease of illustration, the embodiments described herein have been described with reference to mobile networks (e.g., mobile network 20). The term 'mobile networks' as used herein, is intended to include any cellular, satellite, radio or other wireless network that may include some wired connections. It will also be apparent, however, that the concepts presented herein are applicable to any other network environment (e.g., wired network) or combination of network environments where performance counters or other network monitoring devices can be provisioned to collect network data associated with the operation of the network.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system for analyzing mobile network performance in that any suitable arrangements, chronologies, configurations, and timing mechanisms may be provided without departing from the teachings of the discussed concepts.

What is claimed is:

1. A method, comprising:
storing, via one or more processors and one or more memory elements, a plurality of different types of performance counters of a mobile network;
selecting, via the one or more processors, a subset of the different types of the performance counters as relevant to a specific inquiry, the subset including some of the different types of the performance counters and excluding others of the different types of the performance counters;
converting, via the one or more processors, the selected subset into a plurality of key performance indicators (KPIs);
quantizing, via the one or more processors, each of the KPIs into one value of a set of values of the each of the KPIs;
creating, via the one or more processors, a set of items that provide a binary representation of the quantized KPIs, the set of items having multiple subsets corresponding to respective ones of the quantized KPIs, each item of a subset corresponding to a respective value of a particular set of values associated with the respective ones of the quantized KPIs;
generating, via the one or more processors, association rules by applying association rule mining logic to the binary representation of the quantized KPIs; and
generating, via a display, a report based on the association rules to enable analysis of performance data of the mobile network.

2. The method of claim 1, wherein the quantizing the plurality of KPIs includes quantizing a first KPI into a first value of a set of three or more values associated with the first KPI.

3. The method of claim 2, wherein the set of items includes a subset of three or more items corresponding to the three or more values associated with the first KPI, wherein one item of the three or more items indicates the first value is present, wherein other items of the three or more items indicate no other values of the three or more values are present.

4. The method of claim 2, wherein the three or more values correspond to respective threshold levels of a performance target associated with the KPI.

5. The method of claim 4, wherein the respective threshold levels are based on respective distribution factors applied to the performance target associated with the KPI.

6. The method of claim 5, wherein the respective distribution factors are non-linear.

7. The method of claim 1, wherein at least one KPI is a function of a subset of one or more of the plurality of performance counters.

8. The method of claim 1, wherein each of the plurality of performance counters indicates a number of times a respective behavior has been detected in the mobile network.

9. The method of claim 1, further comprising:
generating more association rules based, at least in part, on a second set of items associated with a selected proper subset of the plurality of KPIs and one or more child KPIs of the selected proper subset of the plurality of KPIs.

10. The method of claim 9, wherein at least one KPI in the proper subset of the plurality of KPIs is based on an aggregate of a plurality of other KPIs.

11. The method of claim 10, wherein at least one child KPI is associated with the at least one KPI, and wherein the at least one child KPI represents a specific type of failure in the mobile network.

12. The method of claim 1, wherein the applying the association rule mining logic to the binary representation of the quantized plurality of KPIs includes a hierarchical grouping of the quantized plurality of KPIs.

13. The method of claim 12, further comprising the steps of:
isolating relevant ones of the hierarchical grouping of the quantized plurality of KPIs; and
extracting a rule from the relevant ones of the hierarchical grouping of the quantized plurality of KPIs.

14. At least one non-transitory computer readable medium comprising instructions stored therein that, when executed, cause one or more processors to:
store, via the one or more processors using the at least one computer readable medium, a plurality of different types of performance counters of a mobile network;
select, via the one or more processors, a subset of the different types of the performance counters as relevant to a specific inquiry, the subset including some of the different types of the performance counters and excluding others of the different types of the performance counters;
convert, via the one or more processors, the selected subset into a plurality of key performance indicators (KPIs);
quantize, via the one or more processors, each of the KPIs into one value of a set of values;
create, via the one or more processors, a set of items that provide a binary representation of the quantized KPIs, the set of items having multiple subsets corresponding to respective ones of the quantized KPIs, each item of a subset corresponding to a respective value of a particular set of values associated with the respective ones of the quantized KPIs;
generate, via the one or more processors, association rules by applying association rule mining logic to the binary representation of the quantized KPIs; and
generate, via a display, a report based on the association rules to enable analysis of performance data of the mobile network.

15. The at least one non-transitory computer readable medium of claim 14, wherein the applying the association rule mining logic to the binary representation of the quantized plurality of KPIs includes a hierarchical grouping of the quantized plurality of KPIs.

16. The at least one non-transitory computer readable medium of claim 15, further comprising instructions that, when executed, cause the one or more processors to:
isolate relevant ones of the hierarchical grouping of the quantized plurality of KPIs; and
extract one or more rules from the relevant ones of the hierarchical grouping of the quantized plurality of KPIs.

* * * * *